(12) United States Patent
Parker et al.

(10) Patent No.: US 11,068,116 B2
(45) Date of Patent: Jul. 20, 2021

(54) TOUCH DETECTION AND POSITION RECONSTRUCTION

(71) Applicant: Samsung Electronics Company, Ltd., Suwon si (KR)

(72) Inventors: Ian Parker, Santa Barbara, CA (US); Ye Zhao, San Jose, CA (US); Mohammad Abu Saude, Sunnyvale, CA (US); Sergio Perdices-Gonzalez, Sunnyvale, CA (US); Mustafa Ismail, Sunnyvale, CA (US); Sajid Sadi, San Jose, CA (US)

(73) Assignee: SAMSUNG ELECTRONICS COMPANY, LTD., Suwon (KR)

(*) Notice: Subject to any disclaimer, the term of this patent is extended or adjusted under 35 U.S.C. 154(b) by 0 days.

(21) Appl. No.: 16/696,980

(22) Filed: Nov. 26, 2019

(65) Prior Publication Data
US 2021/0026472 A1   Jan. 28, 2021

Related U.S. Application Data

(60) Provisional application No. 62/878,249, filed on Jul. 24, 2019.

(51) Int. Cl.
*G06F 3/045* (2006.01)
*G06N 20/00* (2019.01)
*G06F 16/22* (2019.01)

(52) U.S. Cl.
CPC .......... *G06F 3/045* (2013.01); *G06F 16/2237* (2019.01); *G06F 16/2282* (2019.01); *G06N 20/00* (2019.01)

(58) Field of Classification Search
CPC .. G06F 3/045; G06F 14/2237; G06F 14/2282; G06N 20/00
See application file for complete search history.

(56) References Cited

U.S. PATENT DOCUMENTS

| | | |
|---|---|---|
| 8,049,738 B2 | 11/2011 | Philipp |
| 8,400,427 B2 | 3/2013 | Perski |

(Continued)

FOREIGN PATENT DOCUMENTS

| | | |
|---|---|---|
| JP | 5399428 | 11/2013 |
| KR | 10-1530188 | 6/2015 |

(Continued)

OTHER PUBLICATIONS

Yang et al. 'Electrick: Low-Cost Touch Sensing Using Electric Field Tomography' in: May 6-11, 2017 CHI Conference, 2017, Denver, CO, © 2017 ACM. ISBN 978-1-4503-4655-9/17/05, DOI: http://dx.doi.org/10.1145/3025453.3025842, 14 pgs.

(Continued)

*Primary Examiner* — Peter D McLoone
(74) *Attorney, Agent, or Firm* — Baker Botts L.L.P.

(57) ABSTRACT

In one embodiment, an electrical device may inject one or more first electrical signals into a resistive layer of a touch sensor. The device may receive one or more second electrical signals each corresponding to a first electrical signal injected by a first electrode. The device may determine, based on the one or more second electrical signals, a vector with each element of the vector corresponding to a value associated with a particular second electrical signal. Each element may depend at least on: a relative location between the first electrode injecting the first electrical signal and a second electrode receiving the second electrical signal, the signal frequency, and a user touch location on the touch sensor. The device may determine the user touch location based on the vector using at least one of a lookup table, a curve-fitting coefficient set, or a machine-learning model.

19 Claims, 17 Drawing Sheets

(56) References Cited

U.S. PATENT DOCUMENTS

| | | |
|---|---|---|
| 8,482,547 B2 | 7/2013 | Christiansson |
| 8,624,872 B2 | 1/2014 | Shih |
| 9,904,464 B2 | 2/2018 | Yanase |
| 10,001,883 B2 | 6/2018 | Kent |
| 2011/0043482 A1 | 2/2011 | Philipp |
| 2012/0001866 A1 | 1/2012 | Rapakko |
| 2013/0027343 A1 | 1/2013 | Calpe Maravilla |
| 2014/0267162 A1 | 9/2014 | Westhues |
| 2016/0209961 A1 | 7/2016 | Ahn |
| 2017/0102827 A1 | 4/2017 | Christiansson |
| 2019/0042053 A1 | 2/2019 | Fomin |
| 2019/0227667 A1* | 7/2019 | Harrison ............... G06F 3/0488 |

FOREIGN PATENT DOCUMENTS

| | | |
|---|---|---|
| WO | WO 2005-006164 A2 | 1/2005 |
| WO | WO 2015/048584 | 4/2015 |
| WO | WO 2016-032107 | 3/2016 |
| WO | WO 2018-067613 A1 | 4/2018 |

OTHER PUBLICATIONS

International Search Report and Written Opinion for International Application No. PCT/KR2020/005960, dated Aug. 6, 2020.

* cited by examiner

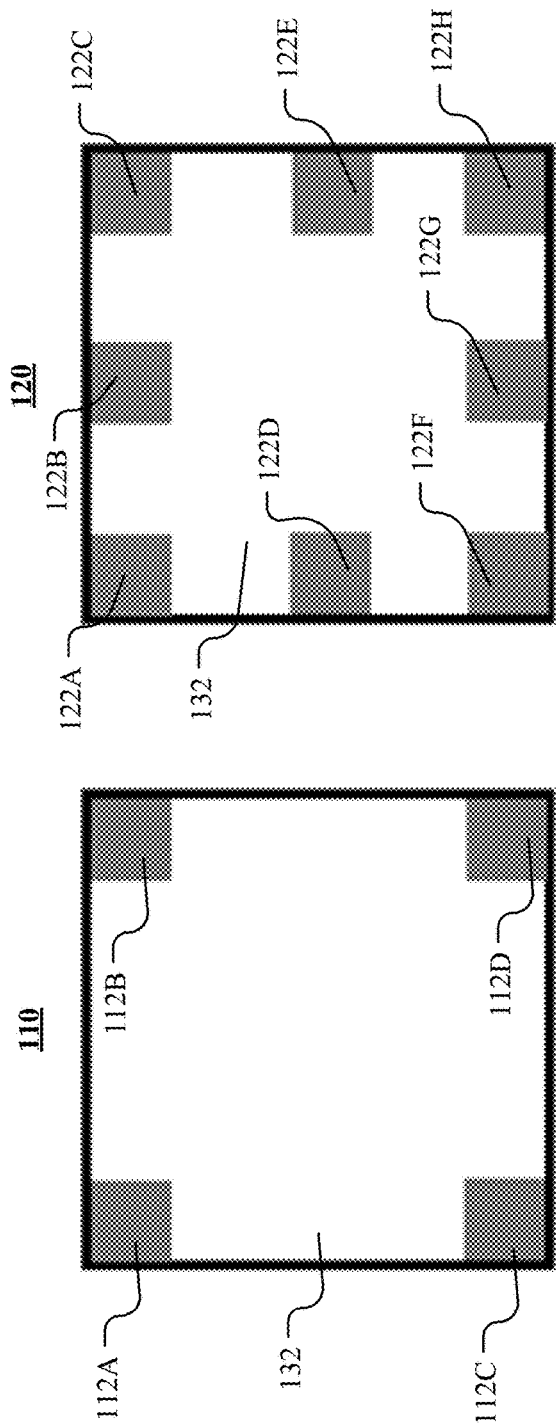
FIG. 1A
FIG. 1B
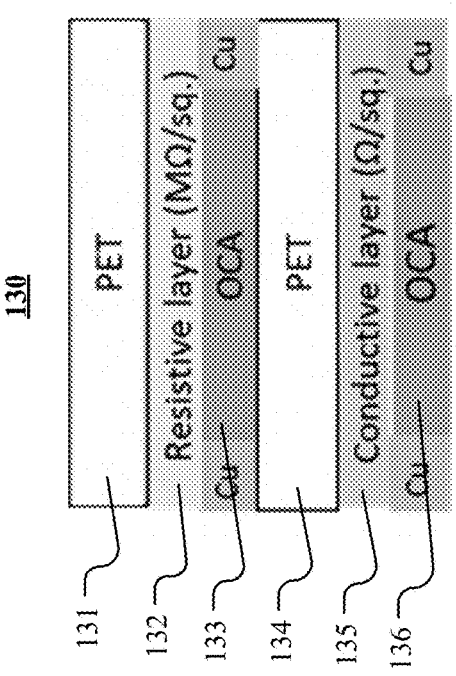
FIG. 1C

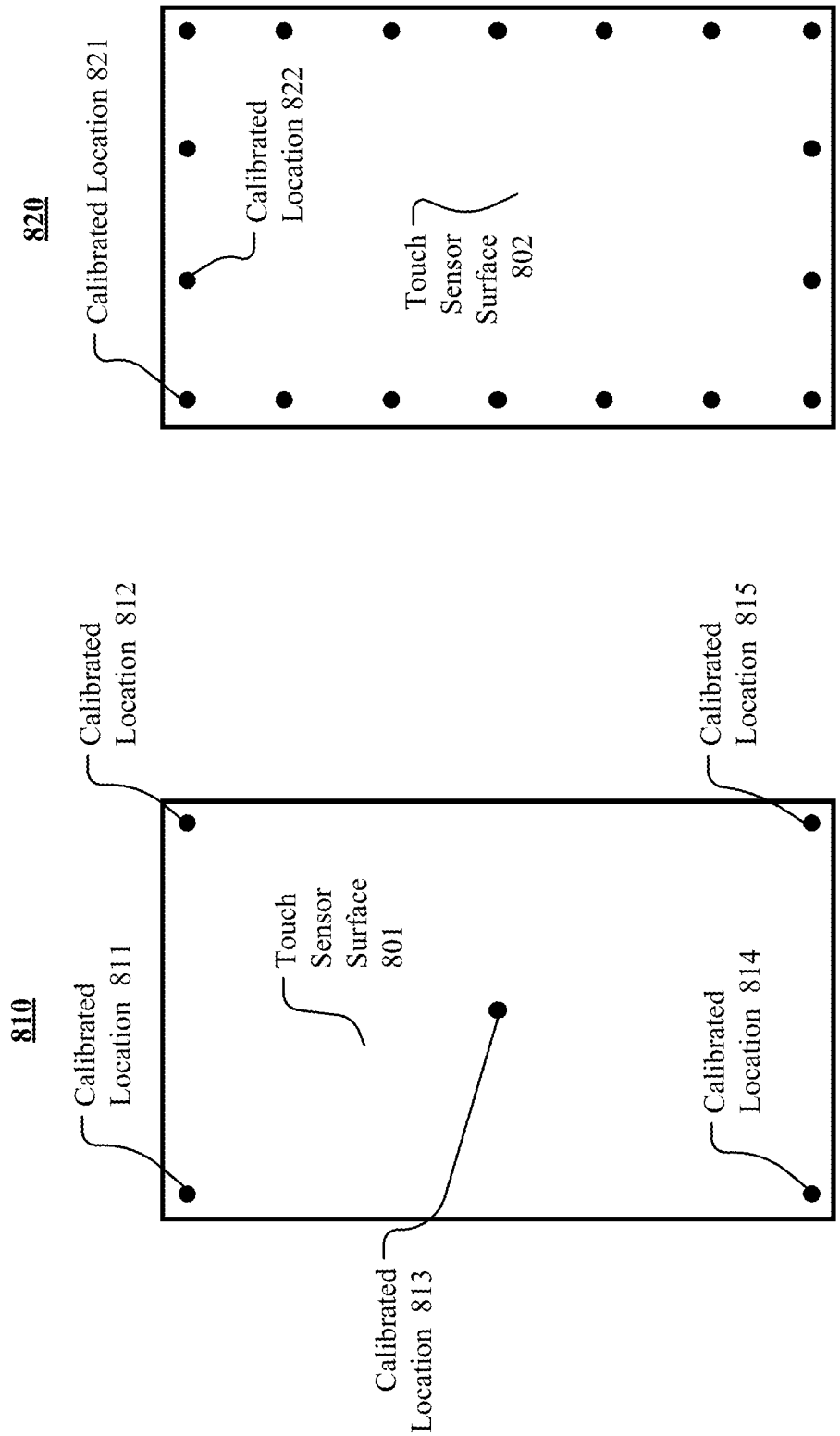

TOUCH DETECTION AND POSITION RECONSTRUCTION

PRIORITY CLAIM

This application claims the benefit, under 35 U.S.C. § 119(e), of U.S. Provisional Patent Application No. 62/878,249 filed 24 Jul. 2019, which is incorporated herein by reference.

TECHNICAL FIELD

This disclosure generally relates to touch-sensing systems for electronic devices.

BACKGROUND

Modern electronic devices may include touch sensors which allow users to interact with the electronic devices. The touch sensor may measure physical touches from users and allow the devices to capture inputs from the users. Each physical contact that a touch sensor records may be sent to a processing unit/software that processes the contact. The touch sensor may respond differently to different kinds of touch and may be used in electronic devices such as smartphones and tablet computers as a means to receive input from users.

Current touch input technologies are expensive, especially when scaled to large surfaces. For example, the touchscreen technologies manufactured onto a rigid glass substrate using a multi-layered, row-column matrix may be too expensive for large surface applications (e.g., TVs). In addition, touchscreen technologies manufactured onto a rigid glass substrate may be not suitable for electronic devices having flexible and non-flat surfaces.

BRIEF DESCRIPTION OF THE DRAWINGS

FIGS. 1A-1B illustrate example electrode arrangements of a touch sensor.

FIG. 1C illustrates an example multi-layer structure of the touch sensor.

FIGS. 8A-8B illustrate example schemes with limited number of touch locations that are calibrated for determining a curve-fitting coefficient set.

DESCRIPTION OF EXAMPLE EMBODIMENTS

Figure 2:
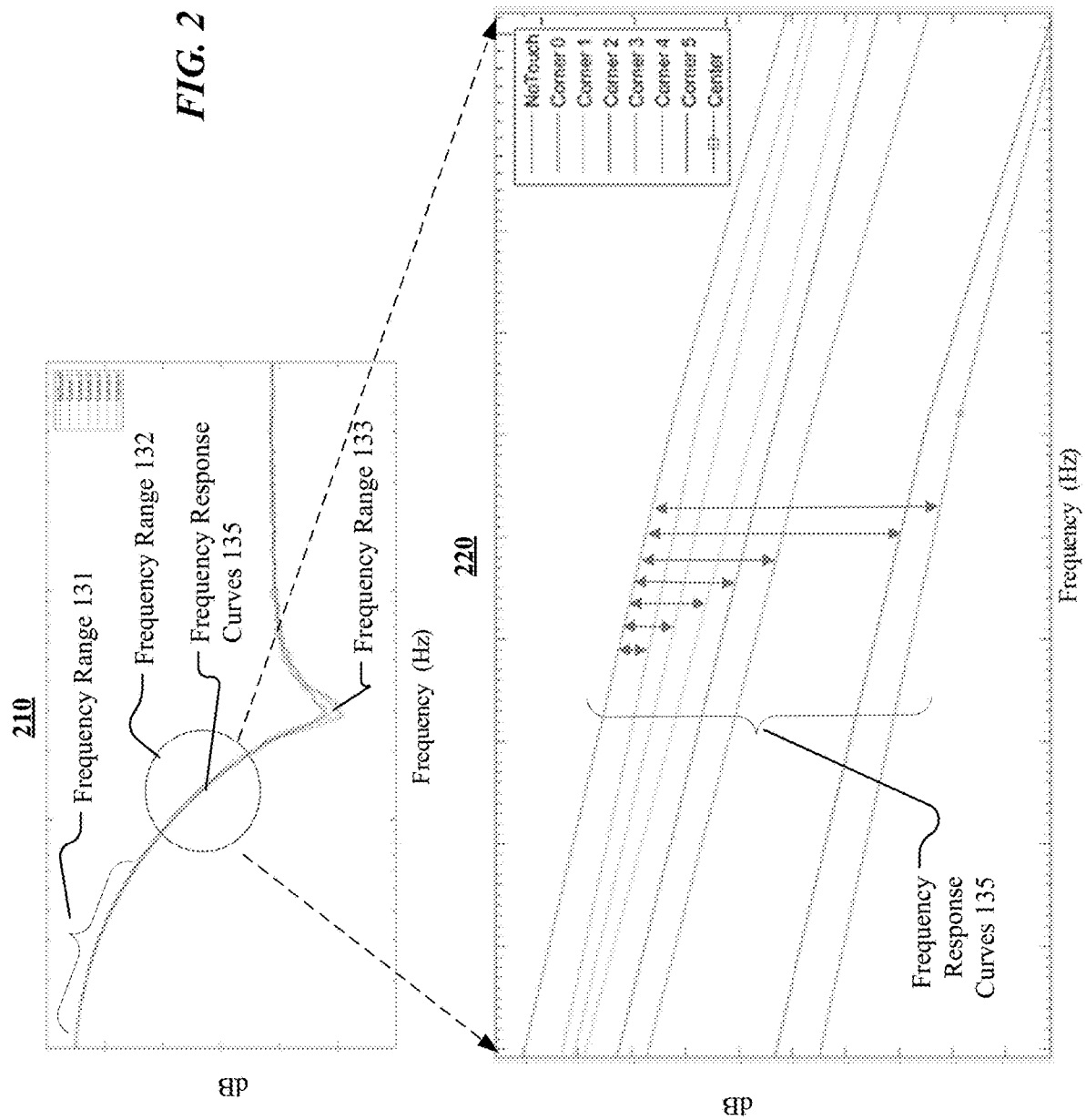
FIG. 2 illustrates an example process for selecting signal frequencies for the touch sensor.

A description of example embodiments is provided on the following pages. The text and figures are provided solely as examples to aid the reader in understanding the disclosed technology. Although certain embodiments and examples have been provided, it will be apparent to those skilled in the art based on the disclosures herein that changes in the embodiments and examples shown may be made without departing from the scope of this disclosed technology. Particular embodiments may include all, some, or none of the components, elements, features, functions, operations, or steps of the embodiments disclosed herein.

Particular embodiments as described in this disclosure may provide a touch-sensing solution which reduces or eliminates the need for conventional electrode-patterning approaches, such as the grid-patterned electrodes used in touch sensors today. Particular embodiments of the system may inject AC voltage signals into a resistive layer of a touch sensor at a number of locations and read electrical signals that are modulated by the user touch location. The system may be based on a shunting effect (shunt mode) of an electric field. When approaching the touch sensor, a human body may capacitively couple to the sensor acting as a low-pass filter and thereby increase the electrical impedance of the AC signals. As a result, the signal strength may be reduced when the user touches the sensor. The system may use one or more mapping algorithms to map the output electrical signals of the touch sensor to the user touch location.

Particular embodiments of the system may provide a touch sensing solution that is inexpensive (e.g., currently less than several dollars per square meter) and scalable to large-scale surfaces such as large-scale TVs. Particular embodiments of the system may provide a touch sensing solution that is flexible and transparent, and therefore is suitable for non-flat surfaces such as the curved surfaces of large-scale TVs. Particular embodiments of the system may provide high accuracy in touch location determination and may work with different finger/body sizes. Particular embodiments of the system may allow the touch sensor to be made into a single layer sensor using a roll-to-roll coating process. Particular embodiments of the system may allow the touch sensor to be easily applied to after-market products (e.g., TVs, white boards, curved dash surface in automobiles, etc.) that need a touch sensor.

FIGS. 1A-1B illustrate example electrode arrangements 110 and 120 of a touch sensor. In particular embodiments, the system as described in this disclosure may be a touch-sensing system or a touch sensor having a multi-layer structure including a resistive layer. In particular embodiments, the touch sensor may have a multi-layer structure including a resistive layer. FIG. 1C illustrates an example multi-layer structure 130 of the touch sensor. As an example and not by way of limitation, the multi-layer structure 130 of the touch sensor may include a first Polyester (PET) film layer 131, a resistive layer 132, a first optical clear adhesive (OCA) layer 133, a second Polyester (PET) film layer 134, a conductive layer 135, and a second optical clear adhesive (OCA) layer 136. In particular embodiments, the PET film layers (e.g., the first PET film layer 131, the second PET layer 134) of the touch sensor may be flexible and conformable to the touch sensor. In particular embodiments, the system may include a number of electrodes which are electrically connected or coupled to the resistive layer 132 for injecting input electrical signals into, and reading output electrical signals from, the resistive layer 132 of the touch sensor. As an example and not by way of limitation, FIG. 1A illustrates an example electrode arrangement including four electrodes 112A-112D at four corners of the resistive layer 132. As another example, FIG. 1B illustrates another example electrode arrangement including eight electrodes 122A-122H located at the four corners and four middle points of the edges of the resistive layer 132. In particular embodiments, the system may include at least two reading electrodes for reading outputs signals from at least two locations. The electrode arrangements as descripted herein are for example purposes only and the system is not limited thereto. For example, particular embodiments of the system may include any suitable number of electrodes and the electrodes may be located at any suitable locations of the resistive layer 132. Moreover, the resistive layer 132 in a square or rectangular shape as described herein is for example purposes only. The resistive layer could be in any suitable shape and any suitable size.

In particular embodiments, the system may inject a number of input electrical signals (e.g., voltage signals) into the resistive layer of the touch sensor through different signal injecting electrodes at different locations. The injected electrical signals may be, for example, but is not limited to, AC voltage signals of particular frequencies, AC current signals of particular frequencies, etc. The system may inject the input signals into the resistive layer of the touch sensor through respective signal injecting electrodes and may concurrently or subsequently read a number of output electrical signals from respective signal reading electrodes. In particular embodiments, the signal injecting electrodes and signal reading electrodes may be different electrodes located at different locations of the resistive layer of the touch sensor. In particular embodiments, one or more signal injecting electrodes and one or more signal reading electrodes may be located at the same locations of the resistive layer. In particular embodiments, a signal injecting electrode and a signal reading electrode may be the same electrode electrically connected or coupled to the resistive layer at a particular location. The system may use the same electrode for both signal injecting and signal reading by switching between two operational states including a signal injecting operation state and a signal reading operation state.

In particular embodiments, the resistive layer of the touch sensor may be a non-patterned resistive sheet having a resistivity in a range of, for example, but not limited to, 200 Kohms to 1 Mohms. In particular embodiments, the resistive layer of the touch sensor may be made of a low cost roll-to-roll conductive coating process. Because of the low cost feature of the resistive material (and the materials for other layers of the touch sensor) and the scalability of the electrode-based signal injecting and reading mechanism, the touch sensor may be scaled to large-scale applications (e.g., large-scale TVs) without significantly increase in its manufacturing cost (e.g., less than server dollars per square meter). Furthermore, the material for making the resistive layer (and other layers) of the touch sensor may be flexible and transparent. The touch sensor may be bent or curved without affecting its touch sensing functionality, and therefore can be applied for non-flat large scale surfaces (e.g., curved TVs, white boards, irregular dash surface of automobile, etc.).

FIG. 2 illustrates an example process 210 for selecting signal frequencies for the touch sensor. In particular embodiments, the system may inject voltage signals of different frequencies into the resistive layer of the touch sensor. The signal frequencies may be selected based on frequency response curves 135 of the system with different user touch locations on the touch sensor (e.g., a center location, four corners, one or more edge center points, etc.). As shown in FIG. 2, the frequency response curves 135 may change their amplitudes in response to different user touch locations (as shown in chart 220 of FIG. 2). In response to the user touches, the frequency response curves 135 may be less sensitive to the user touch in the first frequency range 131 (as illustrated by the frequency response curves 135 being closer to each other). The frequency response curves 135 may have a very low signal strength in the frequency range 133 with a low signal-to-noise ratio. Therefore, the frequency range 133 may not be a good choice for choosing signal frequencies. In contrast, the frequency range 132 may have relatively higher sensitivity than the frequency range 131 and at the same time have consistent relative relation with respect to each other (as shown in 220 of FIG. 2). Therefore, particular embodiments of the system may use frequencies within or close to the frequency range 132 for generating the electrical signals that are to be injected into the resistive layer of the touch sensor.

FIGS. 3A-3F illustrate example output signals (e.g., 313A-B, 315A-B) of the touch sensor in response to different user touch locations. As an example and not by way of limitation, the touch sensor 311 may have a first input signal 312A being injected into the resistive layer at the corner 314C of the touch sensor 311 and a second input signal 312B being injected into the resistive layer at another corner 314B of the touch sensor 311. The first input signal 312A and second input signal 312B may be AC voltage signals at frequencies of 90 kHz and 110 kHz, respectively. The first input signal 312A and second input signal 312B may be injected into the resistive layer of the touch sensor 311 through signal injecting electrodes at respective corner locations. The system may read the output signals from the resistive layer of the touch sensor 311 from the corners 314A and 314D. The output signals of 313 and 315 may each include output signals of two frequencies of 90 kHz and 110 kHz.

Figure 3B:
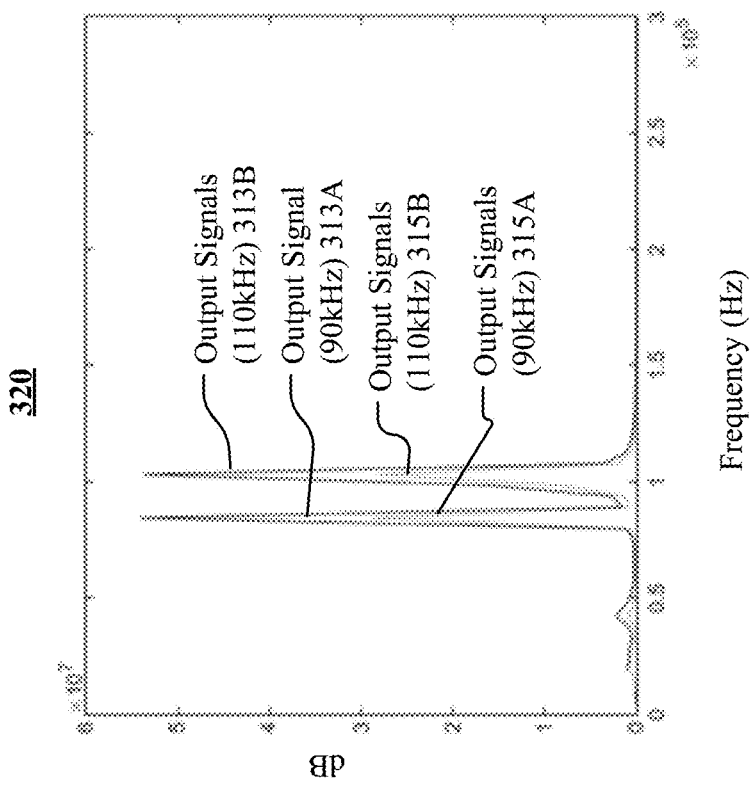
FIGS. 3A-3F illustrate example output signals of the touch sensor in response to different user touch locations.
Figure 3A:
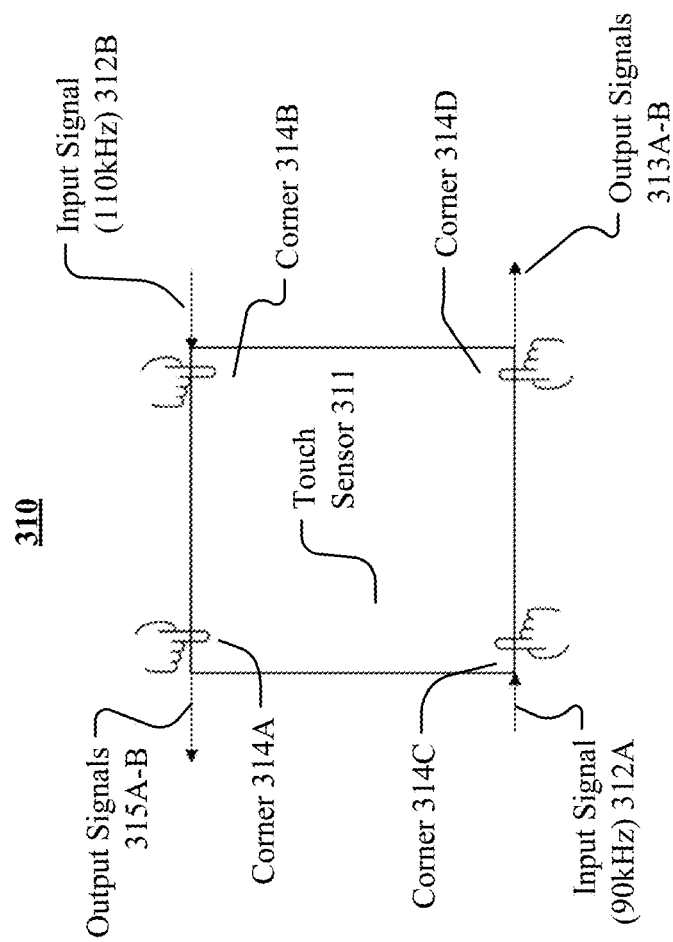

FIG. 3B illustrates example output signals of the touch sensor when there is no user touch. The input signals 312A and 312B may be the voltage signals that are injected into the resistive layer of the touch sensor 311 and may induce electric currents which propagate through and cross the whole resistive layer. Output signals (e.g., voltage signals) could be read from the resistive layer at different locations (e.g., the corner 314A and 314D). For example, the output signals 313 that are read from the corner 314D may include a first output signal 313A at the frequency of 90 kHz and a second output signal 313B at the frequency of 100 kHz. Similarly, the output signals 315 that are read from the corner 314A may include a first output signal 315A at the frequency of 90 kHz and a second output signal 315B at the frequency of 110 kHz. The output signals (e.g., 313A-B, 315A-B) may be voltage signals or current signals in the form of sine or cosine waves in time domain and may be converted into the frequency domain (e.g., by Fourier transform algorithms), as shown in FIG. 3B. The frequency domain signals may be used to determine the corresponding amplitude values of the power spectral density. In this example, when there is no touch on the touch sensor, the two output signals 313A and 313B that are read from the corner 314D may have the same or similar (e.g., within a threshold range) amplitude values of the power spectral density. Similarly, the two output signals 315A and 315B that are read from the corner 314A may have the same or similar (e.g., within a threshold range) amplitude values of the power spectral density. Both the absolute amplitude values and the relative difference between different output signals (e.g., signals of different reading locations, signals of different frequencies and different injecting locations) may be stored and used as the baselines for user touch detection and touch location determination in later steps.

Figure 3C:
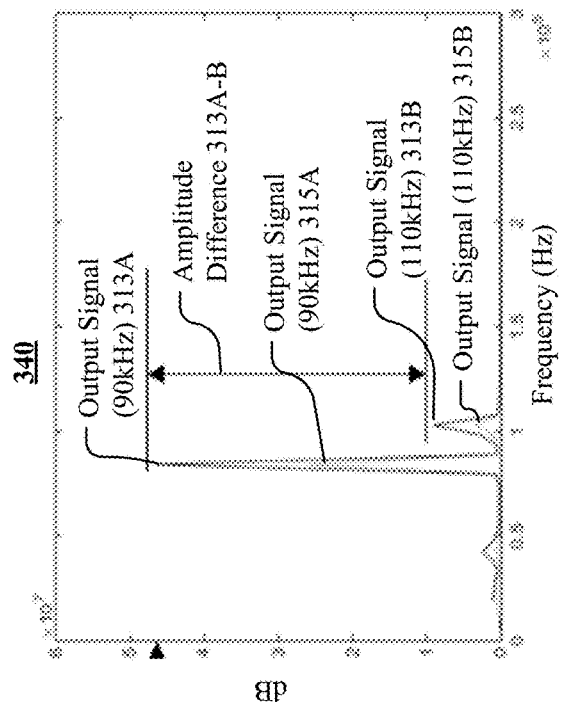

In particular embodiments, when a user touches the touch sensor 311 at a certain location, the user's body may capacitively couple to the sensor, act as a low-pass filter, and increase the electric impedance of the AC signals propagating through the resistive layer, and therefore influence the output signals (e.g., by reducing or increasing the amplitudes of the power spectral density of the output signals). The output signals may depend on one or more of: a reading location of that output signal, an injecting location of an associated input signal, the user touch location, or the frequencies of the corresponding input signals. As an example and not by way of limitation, FIG. 3C illustrates example output signals (e.g., 313A-B, 315A-B) of the touch sensor 311 in response to a user touch at a first corner 314A of the touch sensor 311. When a user touches the corner 314A of the touch sensor 311, the user body may have a stronger influence on the output signal 315A-B than on the output signals 313A-B because the user touch location (i.e., the corner 314A) is more relevant (e.g., closer) to the signal propagating paths from the input signals 312A-B to the reading location of the output signal 315A-B and is less relevant (e.g., farther) from the reading location of output signals 313A-B. As shown in FIG. 3C, the output signals 315A-B may have much lower amplitudes than the output signals 313A-B. In the meantime, the amplitudes of the output signals 315A and 315B may be quite close to each other because the user touch location has a similar relative position to the two input signals of 312A and 312B. The output signals 313A-B may have much higher amplitudes than the output signals 315A-B and the amplitudes of the output signals 313A and 313B may be quite close to each other because the user touch location has a similar relative position to the two input signals of 312A and 312B. The system may detect the user touch event and determine the user touch location based on the absolute or relative amplitude values of the output signals and respective signal baselines.

Figure 3D:
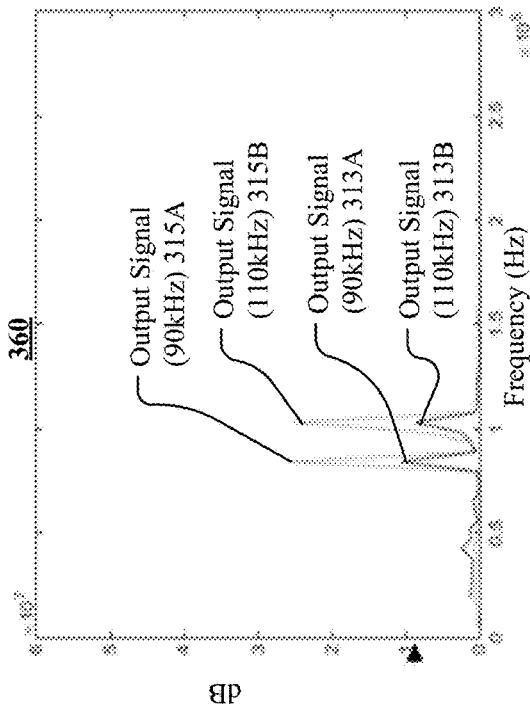

As another example and not by way of limitation, FIG. 3D illustrates example output signals (e.g., 313A-B, 315A-B) of the touch sensor 311 in response to a user touch at a second corner 314B of the touch sensor 311. As shown in FIG. 3D, the output signal 313A may have a much higher amplitude than the output signal 313B and, similarly, the output signal 315A may have a much higher amplitude than the output signal 315B. This is because the user touch location (i.e., the corner 314B) is more relevant (e.g., closer) to the signal paths from the injecting location of input signal 312B to the two reading locations (i.e., the corners 314A and 314D) of the output signals and is much farther from the injecting location of the input signal 312A. The system may detect the user touch event and determine the user touch location based the absolute or relative amplitude values of the output signals and respective signal baselines.

Figure 3E:
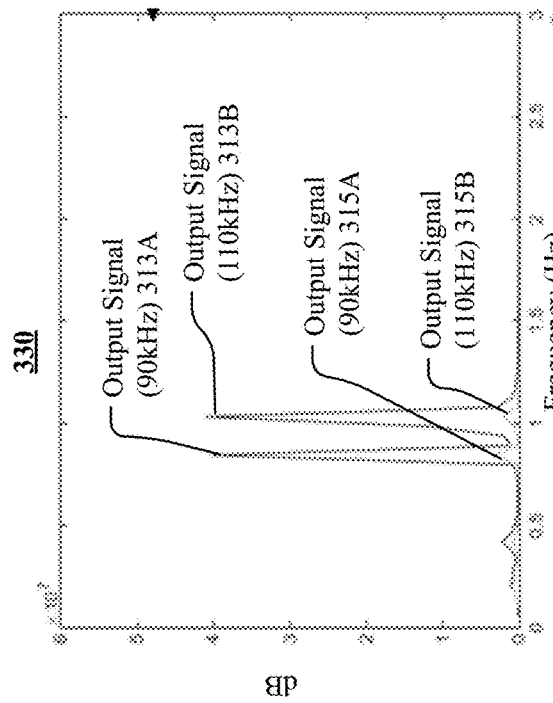

As another example and not by way of limitation, FIG. 3E illustrates example output signals (e.g., 313A-B, 315A-B) of the touch sensor 311 in response to a user touch at a third corner 314C of the touch sensor 311. As shown in FIG. 3E, the output signal 313A may have a much lower amplitude than the output signal 313B and, similarly, the output signal 315A may have a much lower amplitude than the output signal 315B. This is because the user touch location (i.e., the corner 314C) is more relevant (e.g., closer) to the signal paths from the injecting location of input signal 312A to the two reading locations (i.e., the corners 314A and 314D) of the output signals and is much farther from the injecting location of the input signal 312B. The system may detect the user touch event and determine the user touch location based on the absolute or relative amplitude values of the output signals and respective signal baselines.

Figure 3F:
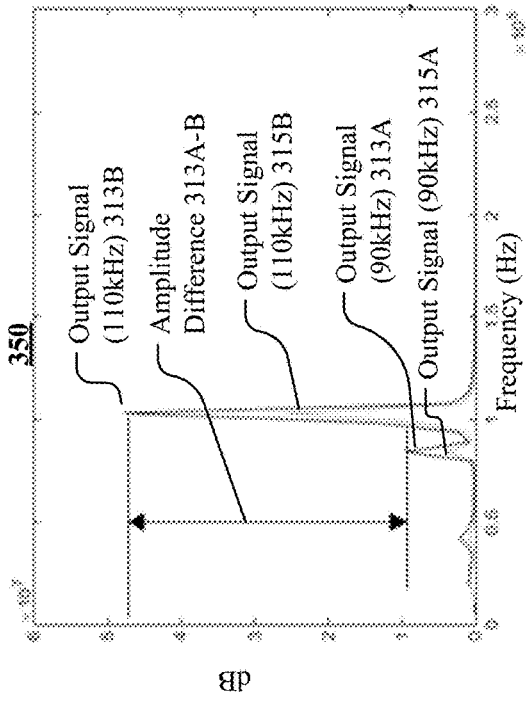

As an example and not by way of limitation, FIG. 3F illustrates example output signals (e.g., 313A-B, 315A-B) of the touch sensor 311 in response to a user touch at a first corner 314D of the touch sensor 311. When a user touches the corner 314D of the touch sensor 311, the user body may have a stronger influence on the output signal 313A-B than on the output signals 315A-B because the user touch location (i.e., the corner 314D) is much closer to the reading location of the output signal 313A-B and is relatively farther from the reading location of output signals 315A-B. As shown in FIG. 3C, the output signals 315A-B, which are less influenced by the user touch, may have higher amplitudes than the output signals 313A-B, which are more influenced by the user touch. In the meantime, the amplitudes of the output signals 315A and 315B may be close to each other because the user touch location has a similar relative position to the two input signals of 312A and 312B. Similarly, the output signals 313A-B may have lower amplitudes than the output signals 315A-B and the amplitudes of the output signals 313A and 313B may be close to each other. The system may detect the user touch event and determine the user touch location based on the absolute or relative amplitude values of the output signals and respective signal baselines.

The output signals and the sensor configuration are for example purposes only and the touch sensor is not limited thereto. For example, the touch sensor may have any number of input signals at any suitable injecting locations. The touch sensor may have any number of output signals at any suitable reading locations and with any suitable frequencies. The signal amplitudes and relative difference are for example purposes only and the touch sensor is not limited thereto. The signal amplitude and relative difference may be any suitable values as determined by the touch sensor configuration (e.g., input signal injecting locations, output signal reading locations, signal frequencies, etc.) and user touch locations.

In particular embodiments, the direct output signals of the touch sensor may be analog signals in the form of sine or cosine waves in the time domain. The system may read the output signals of the touch sensor through one or more analog-to-digital converters (ADCs) which converts the analog signals into digitalized signals. In particular embodiments, the system may use a low-pass filter (LPF) to process the digitalized signals to reduce the high frequency noise and increase the signal-to-noise ratio (SNR). As an example and not by way of limitation, the system may use a low-pass filter with a cutoff frequency of 750 kHz for eliminating or reducing noise signals with higher frequencies than the cutoff frequency. As another example, the system may use a digital filter based on Blackman Harris window to filter the signals. Then, the system may convert the digitalized signals from time domain into frequency domain using a Fourier transform algorithm.

In particular embodiments, the system may stream the digitalized signals into a number of data buffers with each buffer storing one frame of data corresponding to one data sampling point. The system may average the signals of different buffers to further increase the signal-to-noise ratio (SNR). For example, the system may use a rolling average process across multiple data sampling points (e.g., 10 sampling points) corresponding to multiple frames of data to further reduce the signal noise and increase the signal-to-noise ratio (SNR). Then, the system may determine the power spectral density of the output signals in the frequency domain. The power spectral density may be determined for each frame of data stored in a corresponding data buffer. The system may determine the peak amplitude of the power spectral density of an output signal and use that peak amplitude of the power spectral density as the amplitude of that output signal. The system may use the corresponding amplitude values of the power spectral density of different output signals (e.g., being associated with different reading locations and different frequencies) as the element parameters for generating a vector and use that vector for detecting user touch events and determining user touch locations, as will be described in later sections of this disclosure. In particular embodiments, the system may use another rolling average process to process the power spectral density data across a number of data sampling points (e.g., 3 data sampling points, 20 data sampling points, etc.) to further reduce noise prior to sending the data sampling points to the touch location recognition algorithm.

Figure 4:
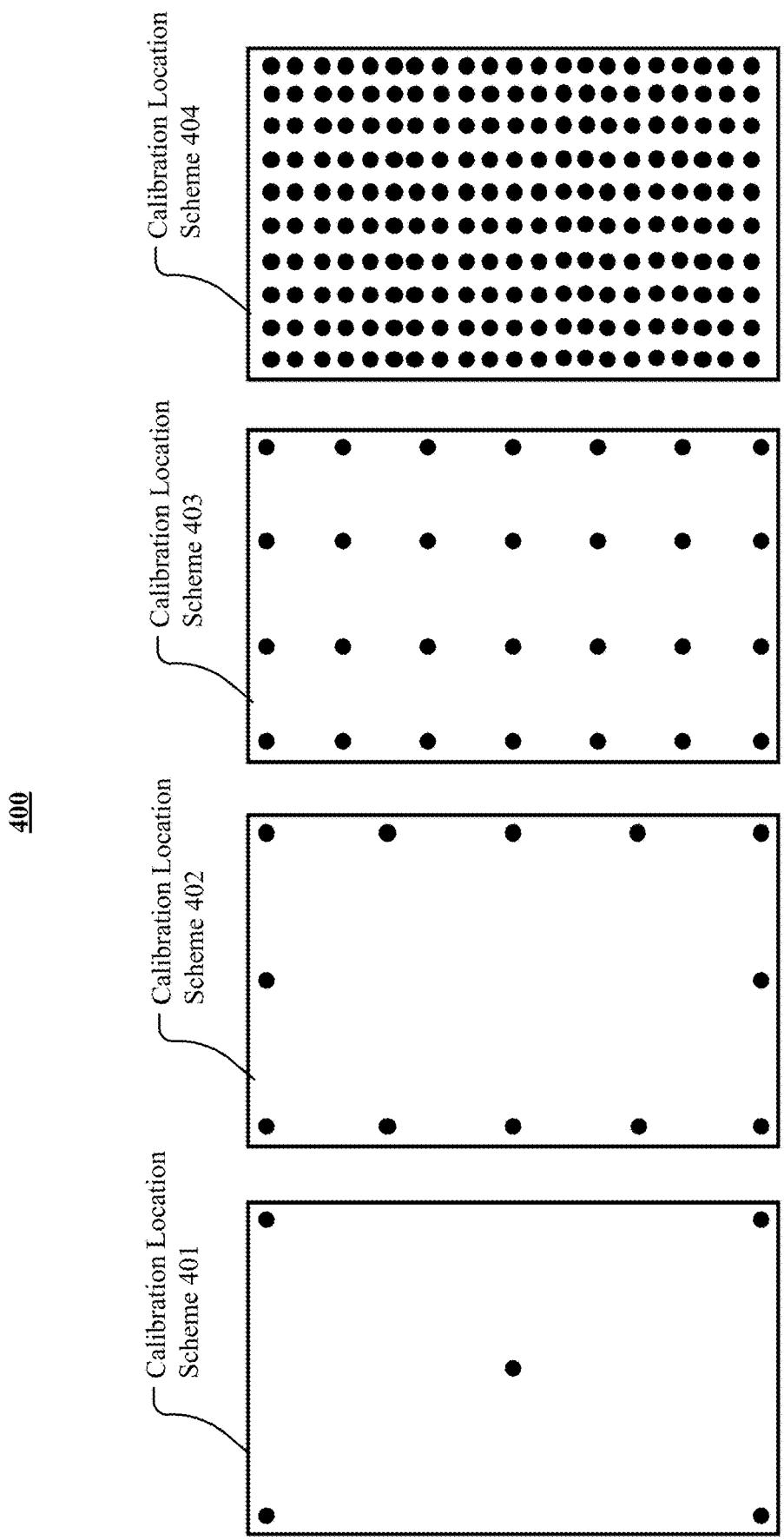
FIG. 4 illustrates example calibration schemes for calibrating the touch sensor at different locations.

FIG. 4 illustrates example calibration schemes 401, 402, 403, and 404 for calibrating the touch sensor at different locations. In order to create a mapping relationship between the voltage readings and touch locations, the touch sensor may need to be calibrated prior to use by having a user or robotic finger touch points with pre-defined locations. In particular embodiments, the system may calibrate the touch sensor using a calibration pipeline for determining the mapping relationship between the touch sensor output signals and corresponding user touch locations. The touch sensor may be calibrated based on a number of known touch locations (e.g., by a human operator or a robot). The system may record the touch sensor output signals for these known touch locations and determine the mapping relationship between the touch sensor responses and the corresponding user touch locations. As an example and not by way of limitation, the system may use the five touch locations as shown in the calibration scheme 401 for calibrating the touch sensor. The four touch locations may include four corners and the center of the touch sensor. As another example, the system may use nine locations as shown in the calibration scheme 402 for calibrating the touch sensor. The nine locations may be uniformly distributed around the touch sensor surface. As another example, the system may use a 7×4 grid as shown in the calibration location scheme 403 or a 21×10 grid as shown in the calibration location 404 for calibrating the touch sensor. As another example, the system may use a 32×16 grid (not shown) for calibrating the touch sensor. The calibration location schemes as described herein are for example purposes only and the touch sensor calibration is not limited thereto. For example, the touch sensor may be calibrated using any suitable touch locations (e.g., corner locations, edge locations, arbitrary locations, a N×M grid of locations, etc.) on the touch sensor surface.

Figure 5A:
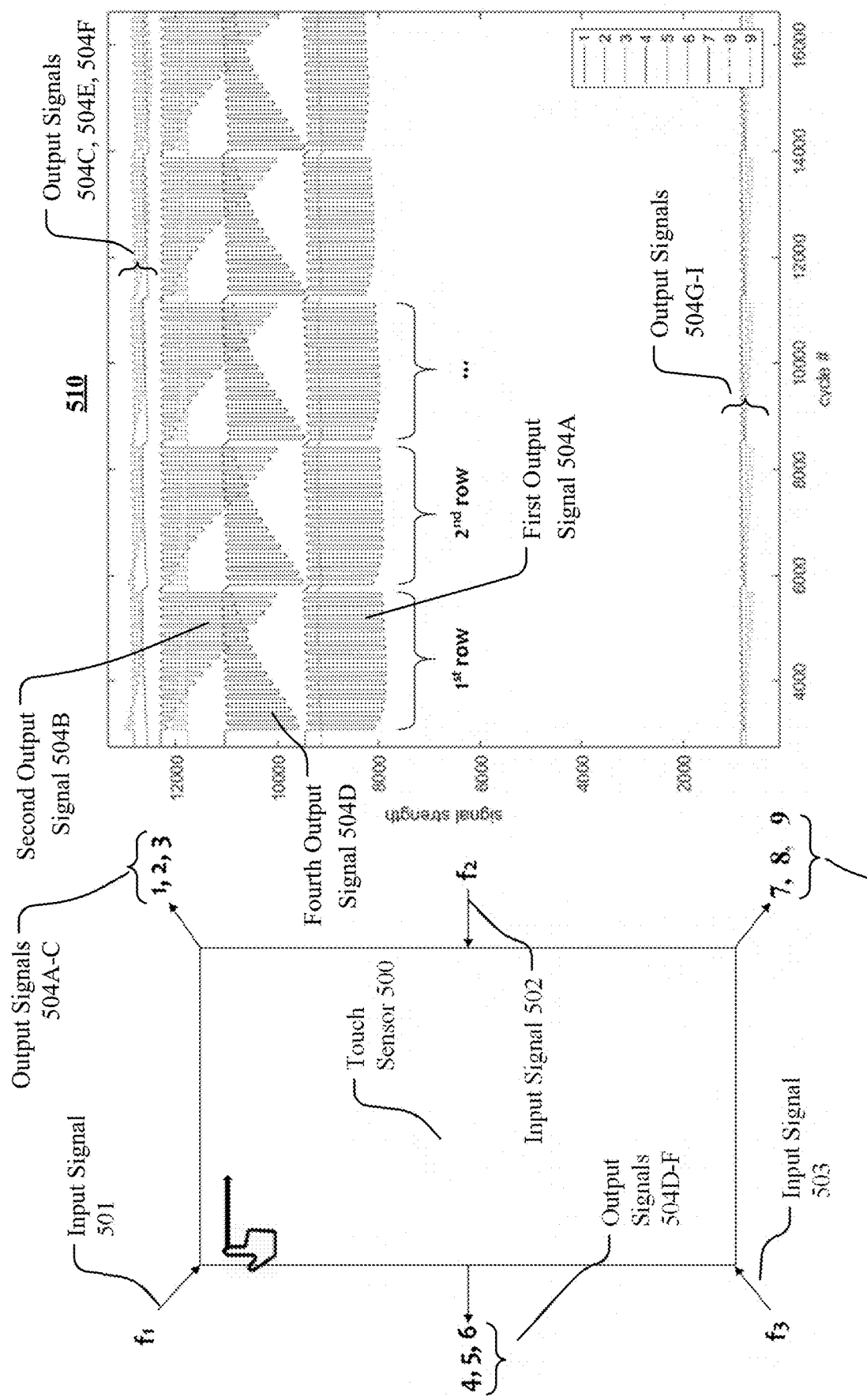
FIG. 5A illustrates an example calibration process for a touch sensor.

FIG. 5A illustrates an example calibration process for a touch sensor 500. As an example and not by way of limitation, the touch sensor may have input signals (e.g., 501, 502, 503) of different frequencies and output signals (e.g., 504A-I) of different locations and frequencies arranged in the configuration as shown in FIG. 5A. The touch sensor may have three input signals 501-503 with the first input signal 501 being injected at the top-left corner, the second input signal 502 being injected at the middle point of the right edge, and the third input signal 503 being injected at the left-bottom corner. The first, second, and third input signals may have different frequencies. The output signals 504A-I may be read from three different locations including the top-right corner (including the first output signal 504A, the second output signal 504B, and the third output signal 504C), the middle point of the left edge (including the fourth output signal 504E, the fifth output signal 504E, and the sixth output signal 504F), and the right-bottom corner (including the seventh output signal 504G, the eight output signal 504H, and the ninth output signal 504I). Each output signal may be associated with an injected input signal of a particular frequency. For example, the first output signal 504A, the fourth output signal 504D, and the seventh output signal 504G may be associated with the first input signal 501 of a first frequency $f_1$ being injected at the top-left corner. The second output signal 504B, the fifth output signal 504E, and the eighth output signal 504H may be associated with the second input signal 502 of a second frequency $f_2$ being injected at the middle point of the right edge. The third output signal 504C, the sixth output signal 504F, and the ninth output signal 504I may be associated with the third input signal 503 of a third frequency $f_3$ being injected at the left-bottom corner.

In particular embodiments, for the calibration process, a user or a robot finger may touch the touch sensor at 512 locations corresponding to a 32×16 grid on the touch sensor surface. The system may read and record the output signals in response to the user touches of different locations. A group of example output signals are as shown in the chart 510 of FIG. 5A where the signal strength of the vertical dimension may correspond to the amplitude values of the power spectral density of the output signals and the horizontal dimension may correspond to the number of measurement cycles. The user or the robot finger may touch the touch sensor surface following an order from the top-left corner toward the right direction of each row and from the topmost row downward. Each dip of an output signal curve may correspond to a user touch at a particular location. Each of the nine output signals 504A-I may have different response values and trends in response to user touch at different locations. For example, for the first row (i.e., the top most row) of touch locations, the first output signal 504A may have relatively large but relatively consistent changes in its amplitude value in response to the touch location changes, as shown in the chart 510, because the touch locations of the first row are on the path from the injecting location of the input signal 501 and the reading location of the first output signal 504A and the influence of the touch at different locations on the output signal amplitude may be relatively large and within a close range with respect to each other.

As yet another example, the second output signal 504B may have gradually larger amplitude changes (with respect to the no-touch state) in response to the touches of different touch locations of the first row moving from left to right.

This is explained by the relative positions of the touch locations with respect to the injecting location of the second input signal 502 and the reading location of the second output signal 504B. When the touch location moves from the left side of the touch sensor surface toward the right side, the touch location may be closer to the path between the input signal 502 and the output signal 504B, and therefore may have gradually stronger influence on the output signal 504B. As yet another example, the fourth output signal 504D may have gradually smaller amplitude changes (with respect to the no-touch state) in response to the touches of different touch locations of the first row moving from left toward right. This is explained by the relative positions of the touch locations with respect to the injecting location of the first input signal 501 and the reading location of the fourth output signal 504D. When the touch location moves from the left side of the touch sensor surface toward the right side, the touch location may be less relevant to the path between the input signal 501 and the output signal 504D, and therefore may have gradually weaker influence on the output signal 504B.

As yet another example, the output signals 504C, 504E-F, and 504G-I may have respective responses to touches at different locations following the same principle. In particular embodiments, an output signal response (e.g., an amplitude change with respect to the no-touch state) may have a larger magnitude when the touch location is more relevant to the path between the injecting input signal and that output signal and may have a smaller magnitude when the touch location is less relevant to the path between the injecting input signal and that output signal. In particular embodiments, an amplitude change of an output signal with respect to the no-touch state may depend on several factors including the relative position between the injecting location of the input signal, the reading location of the output signal, and the user touch locations. In particular embodiments, an amplitude change of an output signal with respect to the no-touch state may depend on the frequency of the corresponding input signal.

Figure 5B:
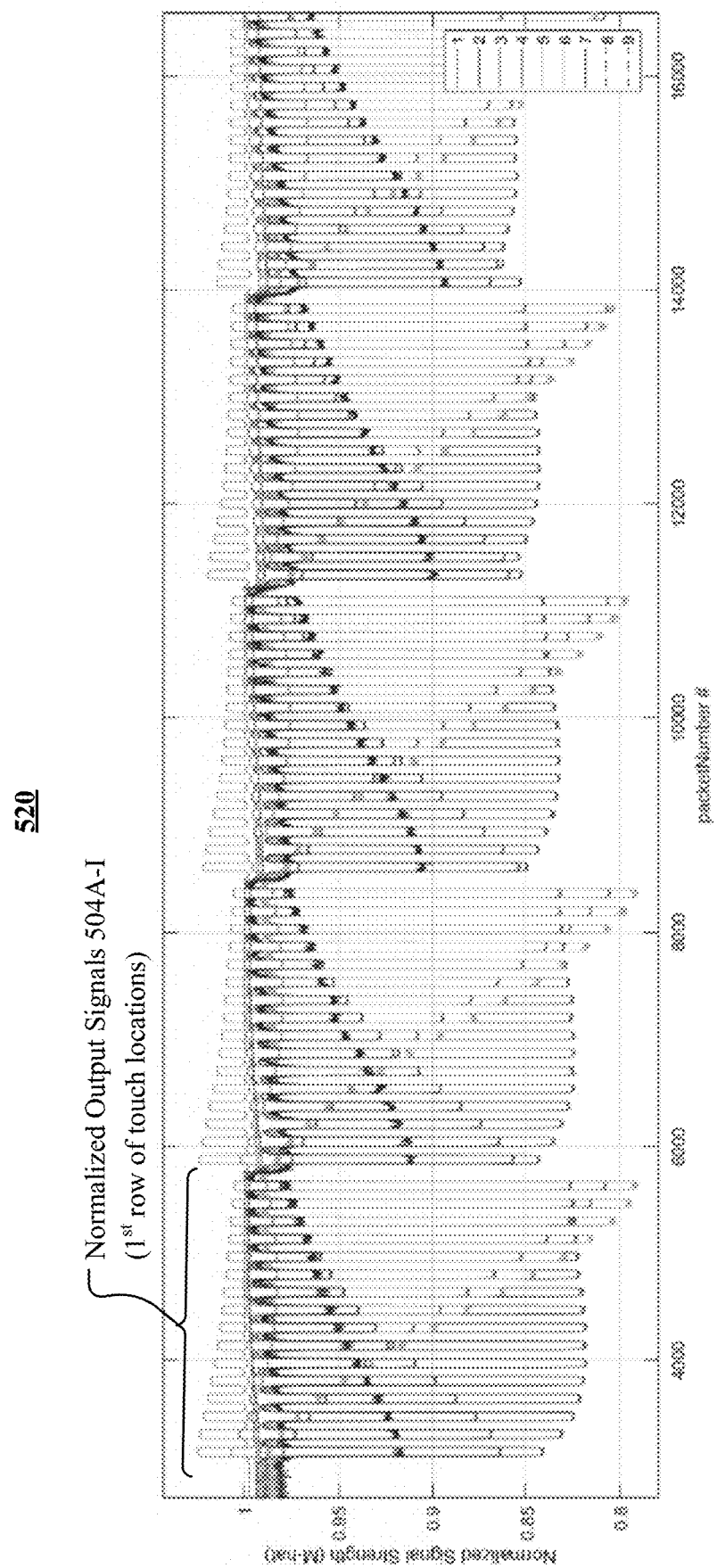
FIG. 5B illustrates example normalized output signals of the touch sensor in response to different touch locations.

FIG. 5B illustrates example normalized output signals (e.g., 504A-I) of the touch sensor in response to different touch locations. In particular embodiments, different output signals of the touch sensor may have different amplitude changes with respect to no-touch state in response to different touch locations following the trends as shown in FIG. 5A. However, due to the difference in relative positions and distances between the injecting location of an input signal and the reading location of an output signal, the absolute amplitude values and amplitude changes (in response to touches) of the output signals may be different from each other. For example, in the chart 510 of FIG. 5A, the first output signal 504A, the second output signal 504B, and the fourth output signal 504D may, in response to the user touches, have amplitude changes (with respect to no-touch state) that are of a similar scale or within a close range. However, the rest of output signals 504C and 504E-I may have their amplitude values and amplitude changes in a larger range and scale, at times significantly so. For example, the output signals 504G-I may have their absolute amplitude values being within a different value range from other output signals. To address this, particular embodiments of the system may normalize the output signals with respect to baselines corresponding to the no-touch state, as shown in FIG. 5B. The system may use the normalized output signals for determining whether there is a user touch on the touch sensor and where the touch point is. By using the normalized output signals, the system may eliminate the effect of different capacitance changes due to different finger/body sizes of different users or different pressure levels as applied on the touch sensor surface by the users.

In particular embodiments, given N number of output signals in total, the system may determine an N-dimensional vector with each element of the vector corresponding to a particular dimension in the N-dimensional space and having a metric value associated with an output signal. As an example and not by way of limitation, the metric value used by the N-dimensional vector may be an amplitude value of the power spectral density of the corresponding output signal. In particular embodiments, for each individual touch event and each output signal, the system may average all frames of data into a single value for determining the N-dimensional vector. In particular embodiments, the system may determine whether there is a user touch on the touch sensor and where is the touch location based on one or more properties of the N-dimensional vector. In particular embodiments, the one or more properties of the N-dimensional vector may be algebraic properties. In particular embodiments, the one or more properties may include, for example, but are not limited to, a Euclidean length, a Euclidean distance with respect to a reference vector (e.g., a reference vector stored in a calibration database, a reference vector corresponding to a no-touch state), a Euclidean angle with respect to a reference vector (e.g., a reference vector stored in a calibration database, a reference vector corresponding to a no-touch state), a sum of all the vector elements, or any other suitable properties.

Figure 6A:
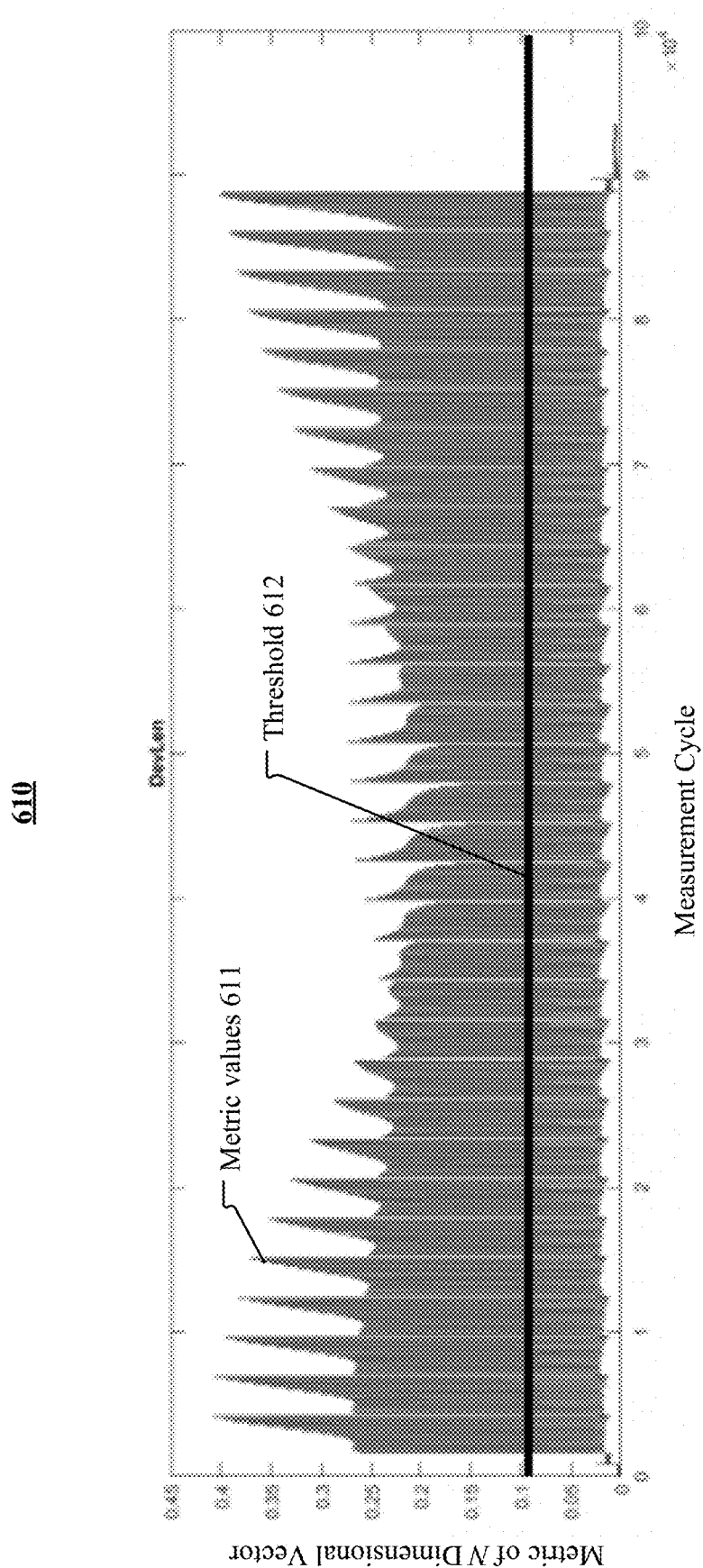
FIGS. 6A-6B illustrate example processes for determining whether there is a user touch event based on pre-determined thresholds.
Figure 6B:
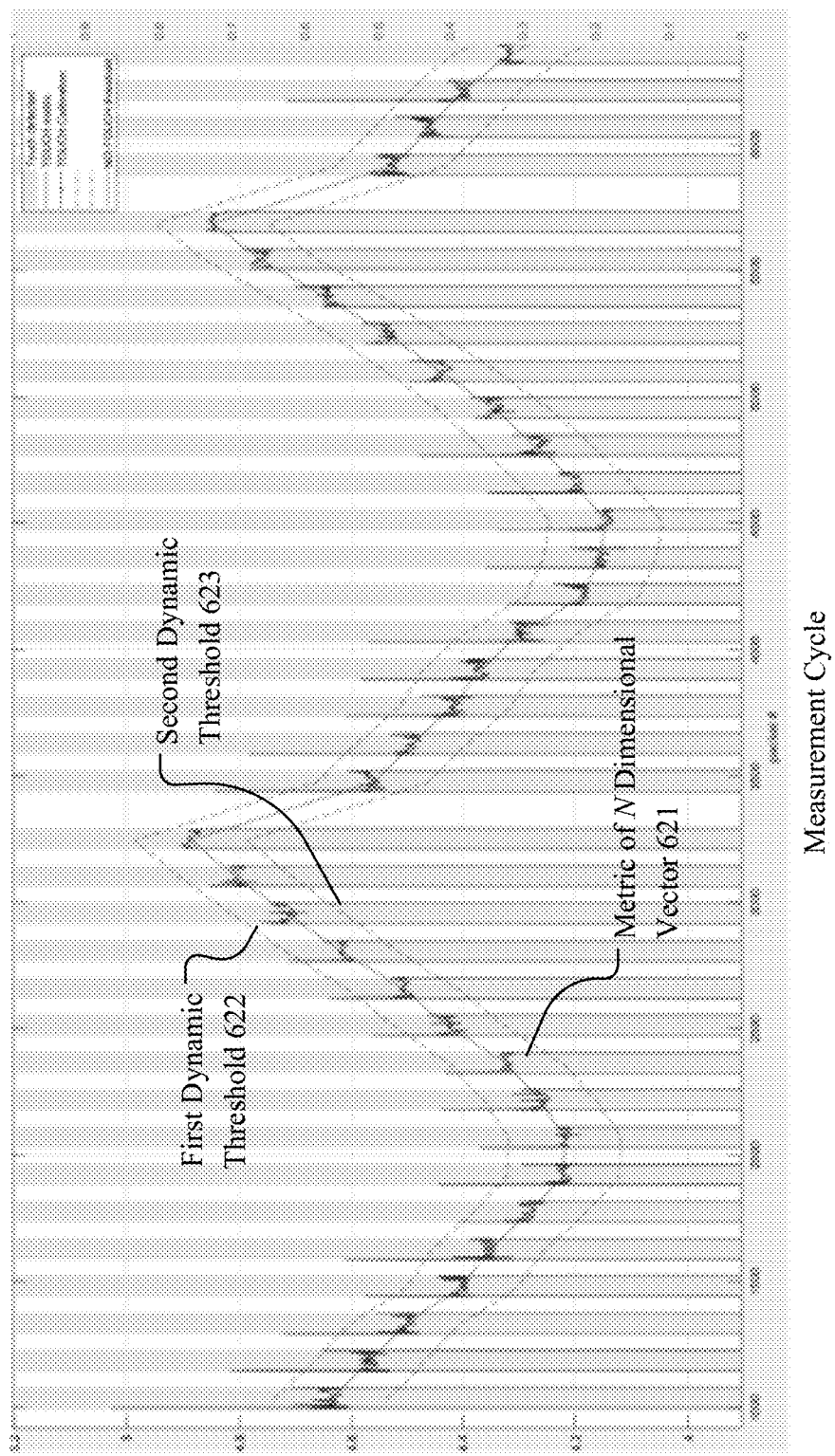

FIGS. 6A-6B illustrate example processes for determining whether there is a user touch event based on pre-determined thresholds. In particular embodiments, the system may determine whether there is a user touch on the touch sensor and where the touch is located based on one or more features or properties associated with the N-dimensional vector (which may be determined in real-time in response to a user touch event). As an example and not by way of limitation, the system may use an overall threshold for determining whether there is a user touch on the touch sensor. The threshold may be associated with any metrics or properties of the N-dimensional vectors (e.g., a Euclidean length, a Euclidean distance with respect to a reference vector, a Euclidean angle with respect to a reference vector, a sum of vector elements, etc.). As shown in FIG. 6A, the system may compare the metric values 611 of the N-dimensional vector to an overall threshold 612. The system may determine that there is a user touch when the metric value is greater than or equal to that overall threshold value and may determine that there is no user touch on the touch sensor when the metric value is below the threshold. By using the overall threshold value, the system may eliminate the false detection of other events (e.g., the user's finger approaches the touch sensor within a distance but does not touch the sensor surface) that induce touch sensor responses that are below the threshold. In particular embodiments, the value of the threshold 612 may be pre-determined based on empirical data during the touch sensor calibration process.

FIG. 6B illustrates an example process for determining whether there is a user touch based on dynamic thresholds. In particular embodiments, the system may use dynamic thresholds for determining whether there is a user touch on the touch sensor. The dynamic thresholds may be for any metrics or properties (e.g., a Euclidean length, a Euclidean distance with respect to a reference vector, a Euclidean angle with respect to a reference vector, a sum of vector elements, etc.) of the N-dimensional vector. As an example and not by way of limitation, the system may compare a metric or property of the N-dimensional vector to a first dynamic threshold 622 and a second dynamic threshold 623 which form a dynamic threshold range. The dynamic threshold values and corresponding dynamic threshold ranges may depend on touch locations. The dynamic threshold values and corresponding dynamic threshold ranges may be predetermined empirically during the touch sensor calibration process. The system may determine that there is a user touch event when the metric or property values of the N-dimensional vector falls within the threshold range and may determine that there is not a user touch event when the metric or property value of the N-dimensional vector is beyond the threshold range. In particular embodiments, the dynamic threshold values that depend on touch locations may provide a finer constraint for touch detection, and therefore allow the system to have a higher accuracy for recognizing and/or distinguishing among a user touch, a user hover, or no-touch.

In particular embodiments, during the calibration process, the system may determine the mapping relationship between the N-dimensional vectors to a number of known touch locations. Each known touch location may correspond to a unique N-dimensional vector with a unique signature or feature (e.g., a unique combination of the element values). In particular embodiments, the system may store the mapping relationship in a calibration database (e.g., a lookup table, a curve-fitting coefficient set, a machine-learning model with a trained parameter set, etc.). During the sensing stage, the system may determine the N-dimensional vector for a user touch event in real-time and map the determined N-dimensional vector to a calculated touch location based on the pre-determined mapping relationship stored in the calibration database. For example, the system may compare the N-dimensional vector to a number of reference vectors stored in a lookup table to determine the calculated touch location. As another example, the system may use a set of curve-fitting coefficients and the N-dimensional vector to calculate the estimated touch location. As another example, the system may feed the N-dimensional vector to a machine-learning model, which may be trained by historical data, for determining the calculated touch location.

In particular embodiments, the system may use a calibration pipeline including a number of steps to calibrate the touch sensor. As an example and not by way of limitation, the system may allow an operator or a robot finger to touch the sensor surface at a number of pre-determined locations. The system may record and save the output signals of the touch sensor in response to each touch by the operator or robot. Then, the system may preprocess the recorded sensor data using one or more digital filters to reduce the noise and increase the signal-to-noise ratio. Then, the system may normalize the output signals with respect to the baselines corresponding to the no-touch state and with respect to the vector size. After that, the system may categorize and label the recorded sensor data as touch data and no-touch data. Then, the system may remove the no-touch data and average the touch data of multiple frames of the same touch event. Finally, the system may determine the mapping relationship based on the averaged touch data and store the mapping relationship in a lookup table. In particular embodiments, the system may calculate the values of the curve-fitting coefficients that map the touch data to the respective touch locations. In particular embodiments, the system may use the touch data with known touch locations to train a machine-learning model (e.g., a LASSO regression model with degree of 8).

In particular embodiments, the system may use a user touch recognition pipeline to determine whether there is a user touch on the touch sensor surface and where is the touch location if there is a user touch. As an example and not by way of limitation, the system may read the output signals of the touch sensor through one or more analog-to-digital converters which digitalize the output signals. Then, the system may preprocess the digitalized output signals using one or more digital filters to reduce noise and increase signal-to-noise ratio. Then, the system may normalize the output signals with respect to respective baselines corresponding to the no-touch state. The system may determine a N-dimensional vector based on the N output signals and normalize the result with respect to the vector size. After that, the system may use a touch recognition module to determine whether there is a user touch. When the system determines that there is a user touch, the system may use a location recognition module to determine a calculated or estimated location of the user touch. In particular embodiments, the system may determine the user touch location with a millimeter level resolution with a measurement speed of 30 frames per second.

In particular embodiments, the system may determine, based on the preprocessed output signals, the N-dimensional vector in real-time with each element of the vector corresponding to an amplitude of the power spectral density of an output signal. The system may normalize the N-dimensional vector with respect to the vector size and calculate a vector metric based on one or more properties of the vector (e.g., a Euclidean length, a Euclidean distance, a Euclidean angle, a sum of vector elements, etc.). In particular embodiments, the system may compare the value of the vector metric to an overall threshold value to determine whether there is a user touch. When the vector metric value is greater than or equal to the threshold, the system may determine that there is a user touch. When the vector metric value is below the threshold, the system may determine that there is no user touch. The threshold value may be pre-determined based empirical data during the calibration process. In particular embodiments, the system may compare the value of the vector metric to a dynamic range as determined by two dynamic threshold values to determine whether there is a user touch. When the vector metric value falls with the corresponding threshold range (i.e., below a first dynamic threshold and above a second dynamic threshold), the system may determine that there is a user touch. When the vector metric value is beyond the corresponding threshold range, the system may determine that there is no user touch. The dynamic threshold values and corresponding threshold range may be different for different touch locations and may be pre-determined based empirical data during the calibration process.

As described in earlier sections of this disclosure, in particular embodiments, the system may calibrate the touch sensor based on a touch grid during the calibration process. The system may generate a lookup table which maps the N-dimensional vectors (as determined based on the output signals of the touch sensor) to respective touch locations. In particular embodiments, the lookup table may contain at least one N-dimensional vector for each touch location of a touch grid. The at least one N-dimensional vector may be determined based on empirical data gathered during the calibration process when the associated touch location is touched. In particular embodiments, the N-dimensional vector associated with a touch location of the touch grid may be an average result of a number of N-dimensional vectors corresponding to that same touch location. In particular embodiments, the lookup table may store a reference N-dimensional vector corresponding to the no-touch state. The reference N-dimensional vector may be used for calculating one or more vector properties including, for example, but not limited to, the Euclidean angles or distance between the stored vectors and the reference vector. In particular embodiments, these properties may be calculated in real-time and used for determining a user touch location. In particular embodiments, the lookup table may store one or more vector properties as determined based on corresponding vectors during the calibration process. For example, the lookup table may store a Euclidean angle value or a Euclidean distance of a N-dimensional vector with respect to a reference vector (e.g., corresponding to the no-touch state) for each location of the calibrated touch grid. In particular embodiments, the lookup table may further contain interpolated sensor data for touch locations that fall between the adjacent touch points of the touch grid. The interpolated sensor data may include N-dimensional vectors that are determined based on interpolation on the N-dimensional vectors corresponding to the touch locations of the touch grid. The interpolated sensor data may provide a finer resolution for the look-up table to determine the user touch location.

Figure 7A:
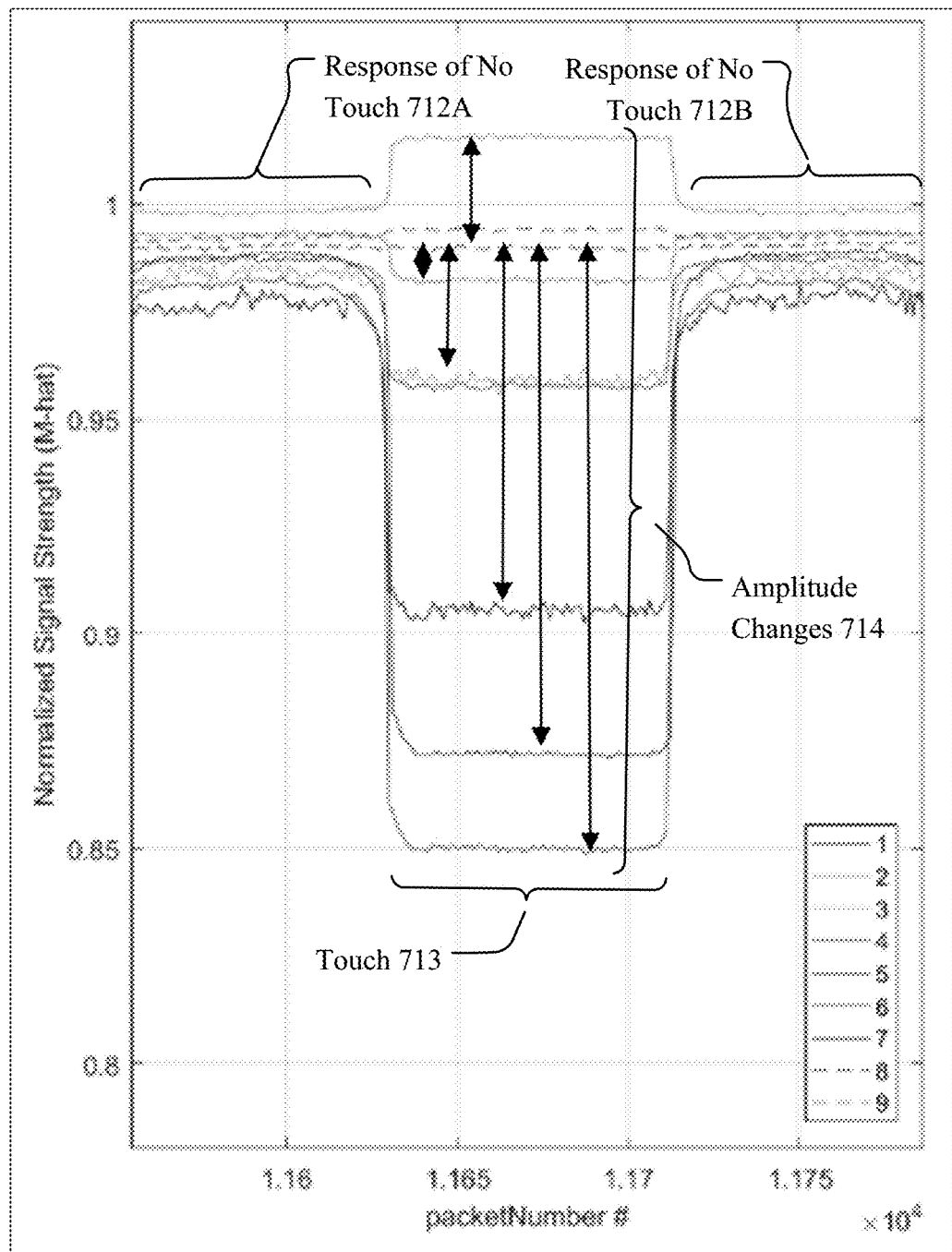
FIG. 7A illustrates an example group of output signals of the touch sensor used for determining a user touch location using a lookup table.

FIG. 7A illustrates an example group of output signals of the touch sensor used for determining a user touch location using a lookup table. In particular embodiments, the system may determine the N-dimensional vector based on the output signals of the touch sensor in real-time and normalize the real-time N-dimensional vector. The system may detect a user touch event based on the normalized real-time data vector. When a user touch on the touch sensor has been detected, the system may use a lookup table to determine the user touch location. As an example and not by way of limitation, the output signals of the touch sensor may include nine output signals with their respective responses to a user touch event shown in FIG. 7A. The output signals as shown in FIG. 7A may be normalized with respect to their respective baselines corresponding to the no-touch state (e.g., responses of no-touch 712A and 712B). In response to the user touch event, the nine output signals may have different amplitude changes 714 with respect to their respective baselines. The combination of the amplitude change values (e.g., amplitude changes 714) may be specific to the touch location and may be used as a signature for determining the touch location by comparing the calibration data stored in the lookup table.

In particular embodiments, the system may determine a N-dimensional vector for the current touch event based on the normalized response signals associated with the user touch event. Each element of the N-dimensional vector may correspond to a normalized amplitude change value of the power spectral density of a corresponding output signal in response to the user touch event. The system may determine one or more properties (e.g., algebraic properties such as a Euclidean length, a Euclidean distance, a Euclidean angle, a sum of vector elements, etc.) of the N-dimensional vector with respect to a reference vector corresponding to the no-touch state. The system may compare these property values to the corresponding property values of a number of N-dimensional vectors accessed from or calculated based on the lookup table. The property values of the N-dimensional vectors for the calibrated touch grid may be accessed from the lookup table or calculated in real-time based on the vectors and the reference vector stored in the lookup table. The system may identify a matching vector from the lookup table by identifying the vector which has the closest property value to that of the N-dimensional vector of the current touch event. Then, the system may determine an estimated user touch location based on the touch grid location associated with the matching vector.

As an example and not by way of limitation, the system may determine a nine-dimensional vector based on the nine response signals as shown in FIG. 7A. The system may determine a Euclidean angle between the nine-dimensional vector and a reference vector corresponding to the no-touch state using the following equation:

$$\cos\theta = \frac{\langle x, r \rangle}{\|x\|\|r\|} \qquad (1)$$

where, θ is the Euclidean angle in the N-dimensional space between x and r, x is the current vector associated with the current touch event, and r is a reference vector corresponding to the no-touch state. Then, the system may compare the Euclidean angle value of the current N-dimensional vector to the Euclidean angles of the vectors (with respect to their baselines) stored in the lookup table. The system may identify a matching vector in the lookup table based on a determination that the matching vector has the closest Euclidean angle value to the current N-dimensional vector of the current touch event. The system may identify, from the lookup table, a touch location associated with the matching vector and use that location as the estimated touch location of the current touch event. The Euclidean angle is for example purposes only and the system may use any suitable properties, for example, but not limited to, Euclidean distances, Euclidean lengths, sums of vector elements, or any other suitable properties.

Figure 7B:
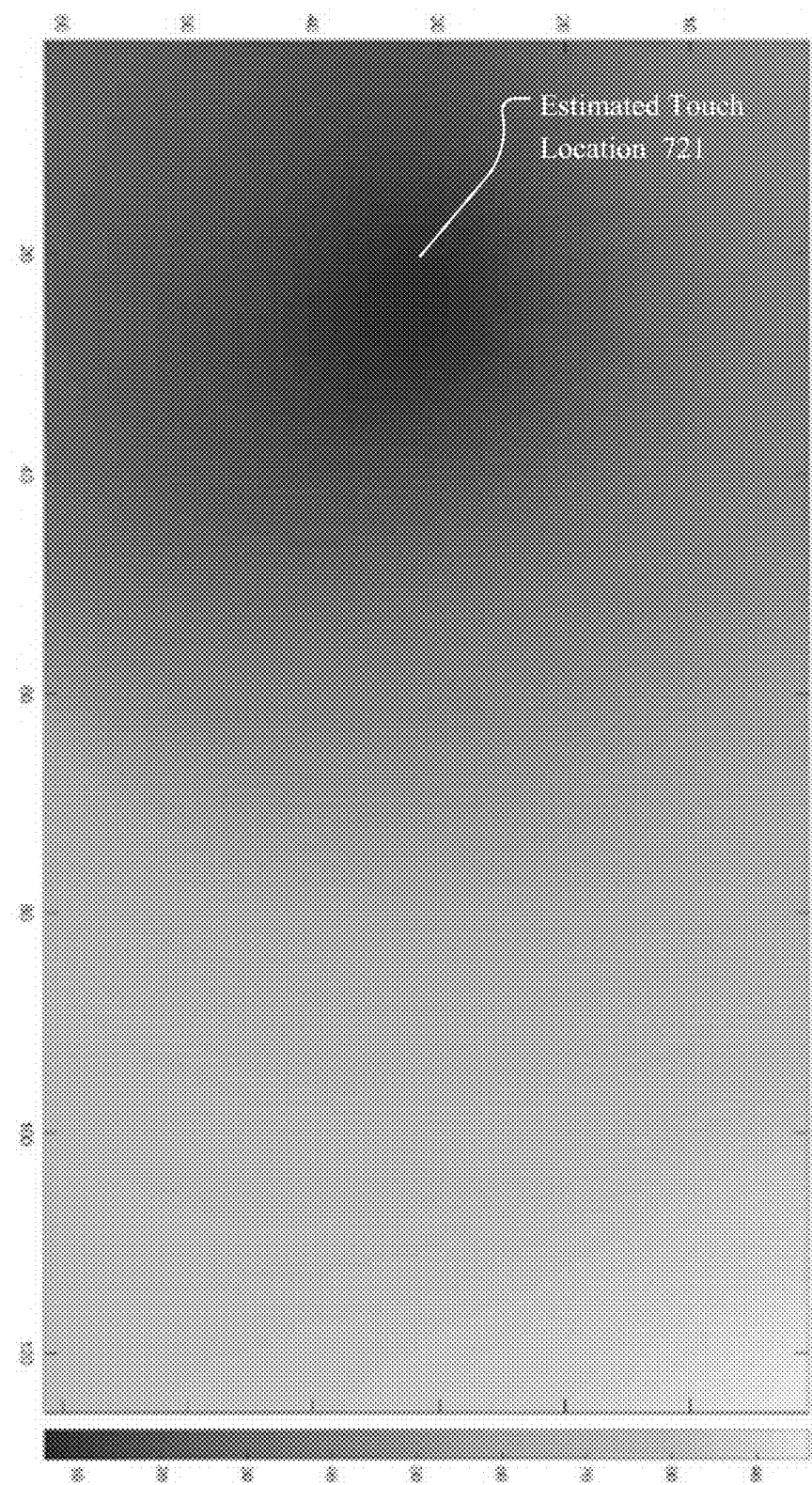
FIG. 7B illustrates an example touch point as determined based on the minimum angle of a current vector and the vectors of the calibrated touch grid accessed from a lookup table.

FIG. 7B illustrates an example touch point as determined based on a minimum angle of a current vector and the vectors of the calibrated touch grid accessed from a lookup table. In particular embodiments, the system may calculate one or more property values of a current N-dimensional vector (of the current touch event) with respect to the vectors of the calibrated touch gird as stored in the lookup table. As an example and not by way of limitation, the system may determine a current N-dimensional vector based on the normalized response signals. The system may determine the Euclidean angles between the current N-dimensional vector and the vectors of the calibrated touch grid stored in the lookup table using the following equation:

$$\cos\theta = \frac{\langle x, y \rangle}{\|x\|\|y\|} \qquad (2)$$

where, θ is the Euclidean angle, x is the current vector associated with the current touch event, and y is a vector associated with a location of the calibrated touch grid. Then, the system may compare all Euclidean angle values with each other and identify a minimum angle value among all the Euclidean angles. The system may identify a matching vector in the lookup table based on a determination that the matching vector has the minimum angle value with respect to the current vector. The system may identify, from the lookup table, the touch location associated with the matching vector and use that location as the estimated location of the current touch event. For example, an example estimation result as determined by this method is shown in FIG. 7B, where a darker grayscale corresponds to a smaller angle value and the estimated touch point is represented by the darkest area of the figure. The Euclidean angle is for example purposes only and the system may use any suitable properties, for example, but not limited to, Euclidean distances, Euclidean lengths, sums of vector elements, etc.

Figure 7C:
FIG. 7C illustrates example results of estimated touch locations using the lookup table method with respect to actual touch locations.

FIG. 7C illustrates example results of the estimated touch locations using the lookup table method with respect to actual touch locations. During this measurement process, the system may use a robot finger carried by a 3-axis robot to touch the sensor surface at the center of each square area (e.g., 731) as defined by the touch grid 733. For the same touch event at the same location (e.g., a center of a square), the measurement and location estimation process may be repeated many times with each cycle generating an estimated location result. The estimated locations may be represented by the dot sets (e.g., 732), as shown in FIG. 7C. Each dot set representing a group of estimated touch locations may be associated with a corresponding square whose center is the actual touch location. A dot set falling within a small area may indicate a higher precision in the estimated locations. A dot set having positions (e.g., a center of the dots) that are closer to the center of the corresponding square may indicate a higher accuracy in the estimated locations. As shown in FIG. 7C, although the system may have different precision and accuracy at different areas or locations of the touch sensor surface, the lookup table method may effectively determine the touch location with a high precision and accuracy.

In particular embodiments, the system may use interpolation between two or more touch locations of the calibrated touch grid to determine the estimated touch location with a finer resolution. As an example and not by way of limitation, the system may determine that the current N-dimensional vector of a current touch event may have a Euclidean angle (with respect to a reference vector of no-touch state) falling within a range of two or more angle values of two or more stored vectors in the lookup table (rather than having a clear closest matching vector). The system may perform interpolation on the two or more associated vectors to determine an estimated location with a finer resolution. The estimated location based on the interpolation may be a point between the two or more locations associated with the two or more stored vectors. As another example and not by way of limitation, the system may determine that the current N-dimensional vector of a current touch event may have multiple Euclidean angle values that are close to each other (e.g., within a pre-determined threshold range) with respect to two or more stored vectors in the lookup table, rather than having a clear minimum angle. The system may perform interpolation on the two or more associated vectors to determine an estimated location with a finer resolution. The estimated location based on the interpolation may be a point between the two or more locations associated with the two or more stored vectors. In particular embodiments, the system may generate and store the interpolated sensor data (e.g., vectors) in the lookup table during the calibration process. The system may determine an estimated location for the current touch event with a finer resolution than the calibrated touch grid by comparing the current vector to interpolated data as stored in the lookup table.

FIGS. 8A-8B illustrate example schemes 810 and 820 with limited number of touch locations that are calibrated for determining a curve-fitting coefficient set. In particular embodiments, the touch sensor may be calibrated on a relatively small number of touch locations (e.g., a less dense touch grid, limited touch locations including corners and the center, limited touch locations around the edges, etc.). As an example and not by way of limitation, the touch sensor may be calibrated at the touch locations including the four corners 811, 812, 813, and 814 and the center 813 of the touch sensor surface 801, as shown in the calibration scheme 810 of FIG. 8A. As another example, the touch sensor may be calibrated at limited number of touch locations (e.g., 821, 822) around the edges of the touch sensor surface 802, as shown in the calibration scheme 820 of FIG. 8B. In particular embodiments, the limited number of touch locations (e.g., schemes 810 of FIG. 8A and 820 of FIG. 8B) at which the touch sensor is calibrated may not provide an acceptable resolution if this calibration data is used in a lookup table (because of the limited calibrated locations).

In particular embodiments, the system may use curve-fitting methods to determine the vector-location mapping relationship during the calibration process. The system may record the touch sensor output signals in response to the user touches at the known locations and determine the corresponding N-dimensional vectors based on sensor response signals. Then, the system may calculate the values of a set of curve-fitting coefficients based on one or more curve-fitting methods. In particular embodiments, the curve-fitting methods may include, for example, but are not limited to, polynomials curve-fitting methods of varying degrees, exponential curve-fitting methods, logarithmic curve-fitting methods, etc. As an example and not by way of limitation, the system may use a k-degree polynomial curve fitting method for determining a curve-fitting coefficient set based on N-dimensional vectors and corresponding touch location coordinates using the following equations:

$$X = a_1 s_1^k + a_2 s_1^{k-1} + a_3 s_1^{k-2} + \ldots + a_{m-1} s_N^1 + a_m \tag{3}$$

$$Y = b_1 s_1^k + b_2 s_1^{k-1} + b_3 s_1^{k-2} + \ldots + b_{m-1} s_N^1 + b_m \tag{4}$$

where X and Y represent the coordinates of the touch locations, $s_n$ represents the vector element corresponding to the n-th signal, $a_i$ and $b_i$ are the curve-fitting coefficients. During the calibration process, the system may determine the coefficient values of the $a_i$ and $b_i$ by solving the above two equations with known values for touch location coordinates and corresponding N-dimensional vectors. The curve-fitting coefficient set after being determined may be stored in a calibration database which could be accessed during the actual measurement process.

Figures 8C, 8D, 8E:
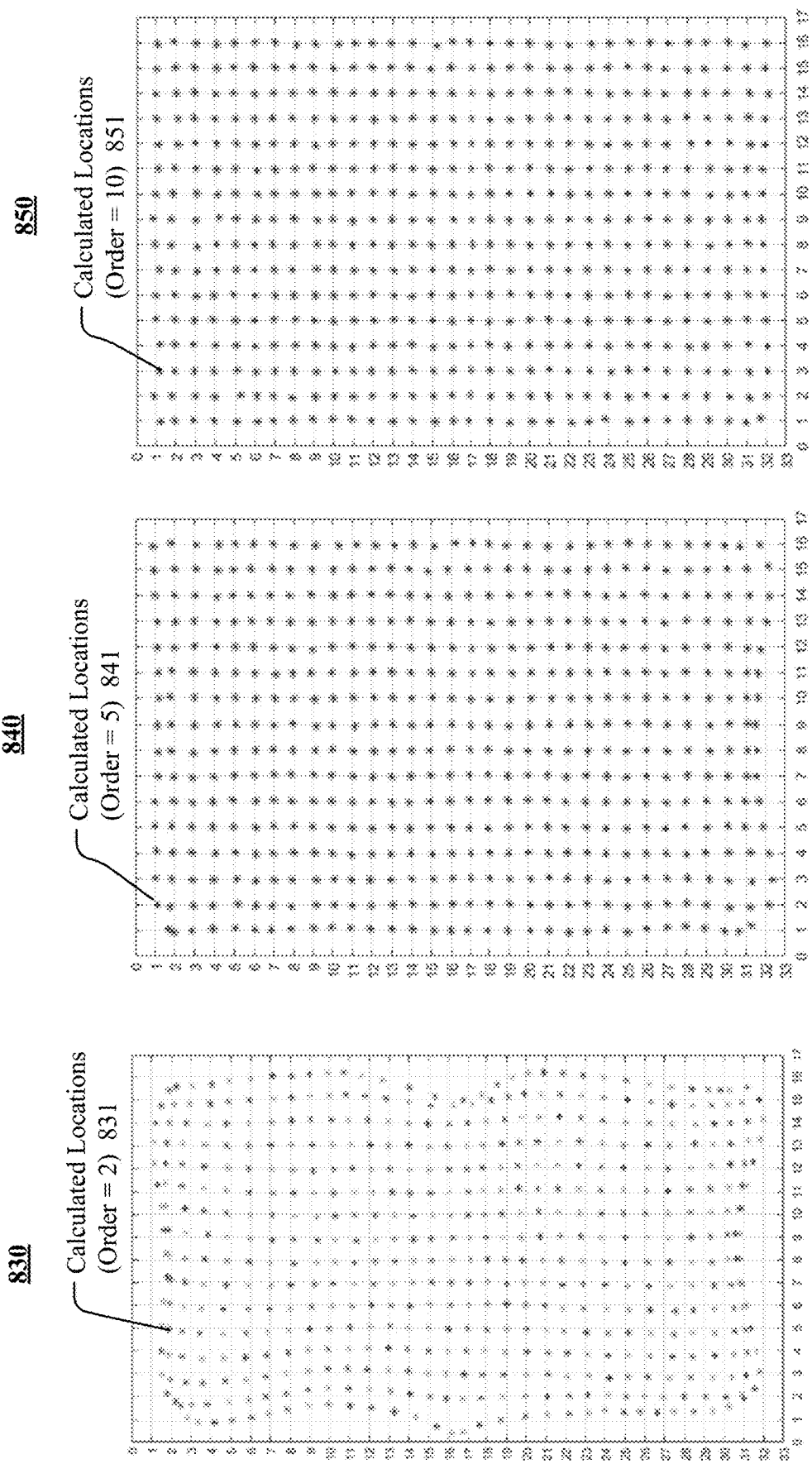
FIGS. 8C-8E illustrate example results of calculated touch locations using curve-fitting methods.

FIGS. 8C-8E illustrate example results of calculated touch locations (e.g., 831, 841, 851) using curve-fitting methods. In particular embodiments, during a touch sensing process, the system may record the output signals of the touch sensor in response to a user touch event. The system may determine the N-dimensional vector based on the recorded output signals and use curve-fitting coefficients and the equations (3) and (4) to directly calculate the coordinate values X and Y of the estimated or calculated touch location. As an example and not by way of limitation, FIG. 8C shows the calculated touch locations (as represented by asterisks in the figure, e.g., 831), with respect to actual touch locations (as represented by the intersections of the touch grid), as determined based on 2-degree polynomial curve fitting for the N-dimension vectors. As another example and not by way of limitation, FIG. 8D shows the calculated touch locations (as represented by asterisks in the figure, e.g., 841), with respect to actual touch locations (as represented by the intersections of the touch grid), as determined based on 5-degree polynomial curve fitting for the N-dimension vectors. As yet another example and not by way of limitation, FIG. 8E shows the calculated touch locations (as represented by asterisks in the figure, e.g., 851), with respect to actual touch locations (as represented by the intersections of the touch grid), as determined based on 10-degree polynomial curve fitting for the N-dimension vectors. As shown in FIGS. 8C-E, the calculated touch locations may have better accuracy with increasing order of polynomial orders, and the 10-degree polynomial curve fitting may accurately determine the user touch locations. By using the curve-fitting methods, the system may determine the touch location with no need for using a lookup table or interpolating between calibrated locations, and therefore may have a higher location resolution than the lookup table method (e.g., a location resolution corresponding to a screen resolution associated with the touch sensor). By using the curve-fitting method, the system may not need to perform vector calculations for all of the vectors stored during the calibration process, and therefor may have a faster frame rate and be easier to scale to larger display screens.

Figure 9:
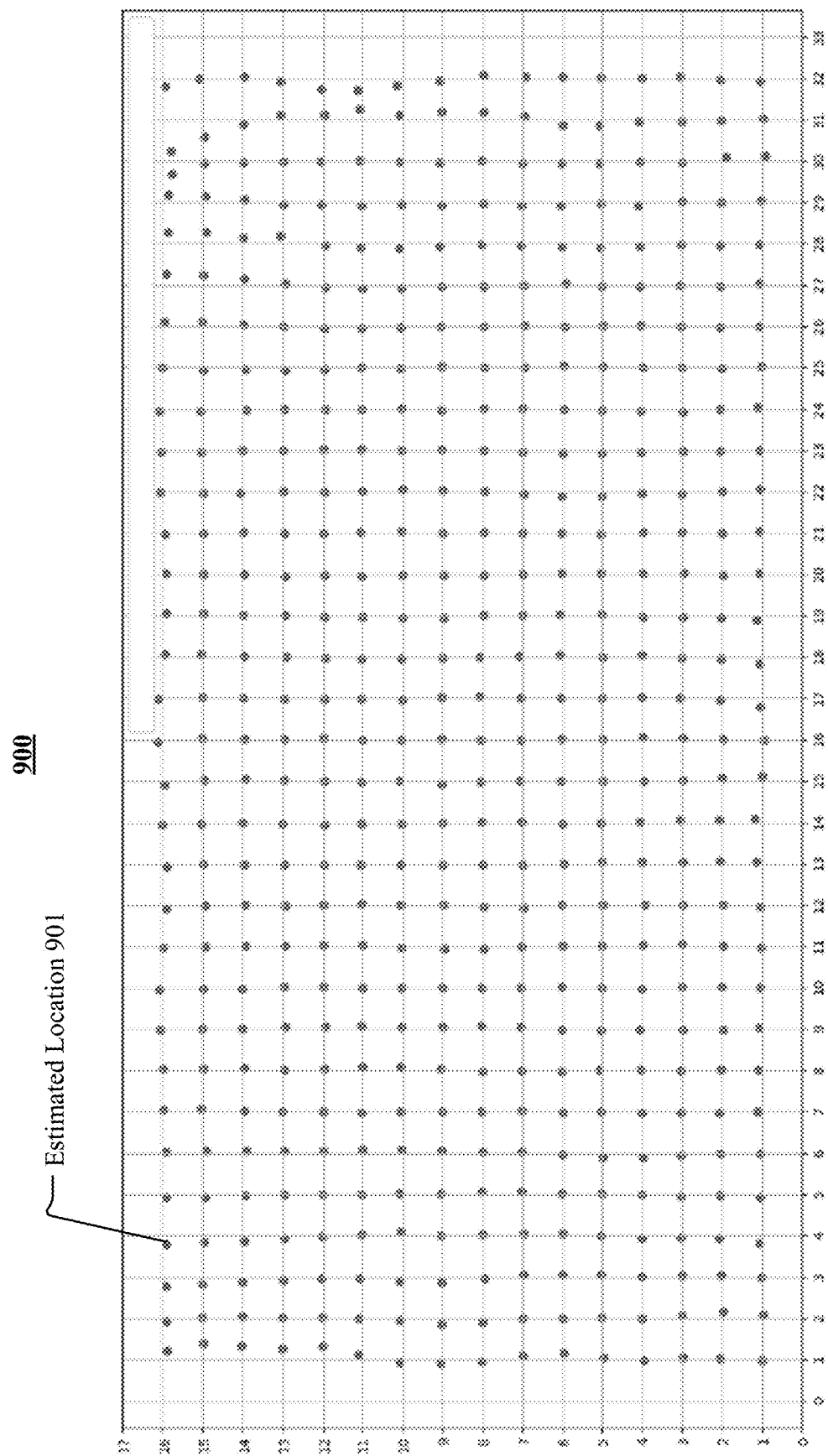
FIG. 9 illustrates example results of estimated touch locations using a machine-learning model.

FIG. 9 illustrates example results of estimated touch locations (e.g., 901) using a machine-learning model. In particular embodiments, the system may use a machine-learning model to determine the vector-location mapping relationship during the calibration process. The system may record the touch sensor output signals in response to the user touches at the known locations and determine the corresponding N-dimensional vectors based on sensor response signals. Then, the system may feed the N-dimensional vectors with known touch locations to the machine-learning model for training. The machine-learning model may adjust its coefficient values in response to different N-dimensional vectors and known touch locations being fed into the model. After being trained, the machine-learning model may be used to determine the touch location of a user touch event based on the corresponding N-dimensional vector as determined in real-time. In particular embodiments, the system may use, for example, but not limited to, least absolute shrinkage and selection operator (LASSO) regression, ridge regression, elastic net regression, random forest regression, or/and different regularization techniques, etc. As an example and not by way of limitation, FIG. 9 shows example results of estimated touch locations (e.g., 901) as determined using an 8-degree LASSO regression model. The estimated touch locations may be represented by the dots with the respective actual touch locations being represented by the intersections of the touch grid. As shown in FIG. 9, the 8-degree LASSO regression model may accurately determine the user touch locations.

Figure 10:
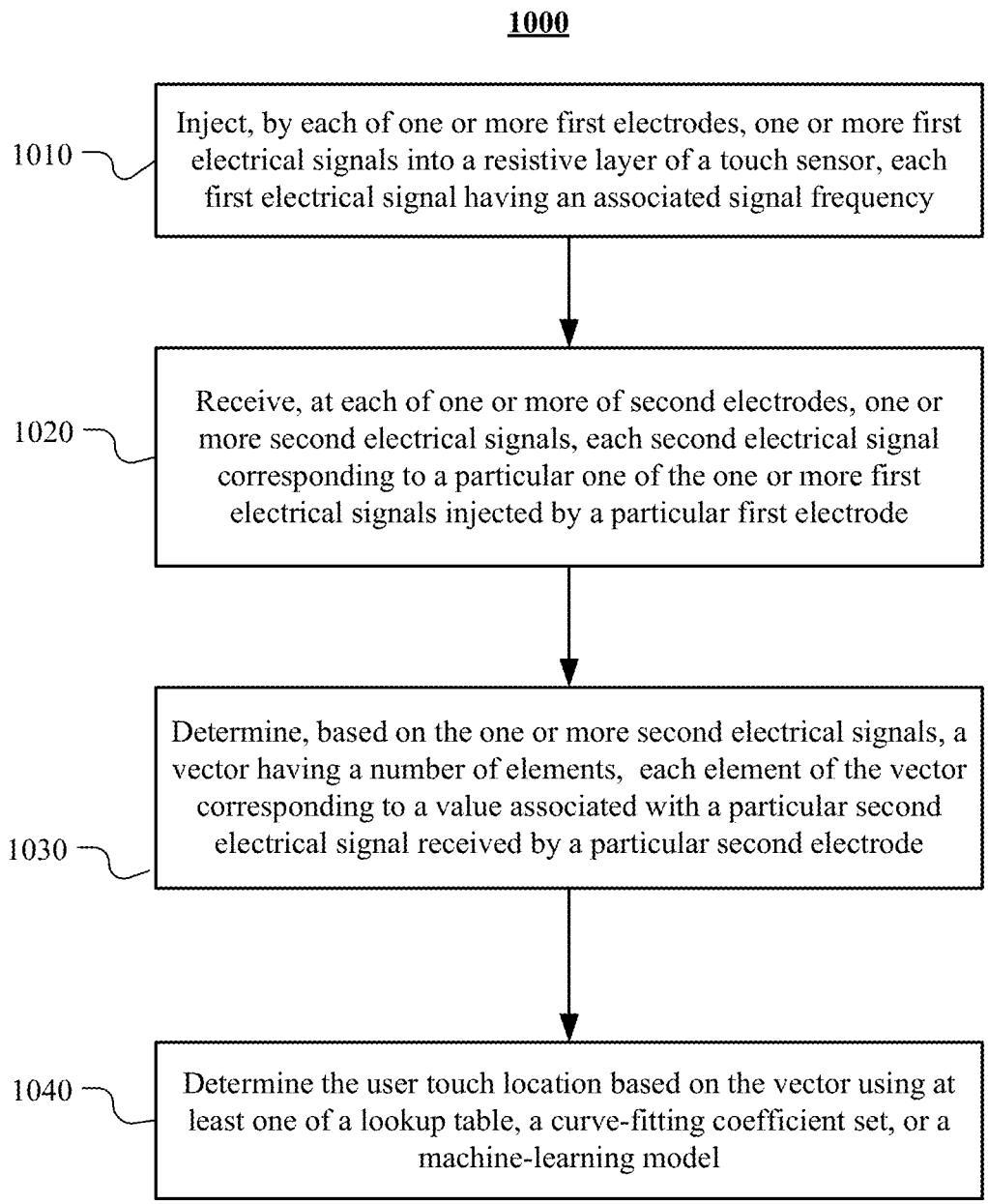
FIG. 10 illustrate an example method for determining a user touch location based on a real-time N-dimensional vector of the touch sensor.

FIG. 10 illustrates an example method 1000 for determining a user touch location based on a real-time N-dimensional vector of the touch sensor. In particular embodiments, the system may include an electronic device including a number of signal injecting electrodes and signal reading electrodes. The method may start at step 1010, where the electronic device may inject, by each of one or more first electrodes, one or more first electrical signals into a resistive layer of a touch sensor. Each first electrical signal that is injected may have an associated signal frequency. At step 1020, the electronic device may receive, at each of one or more of second electrodes, one or more second electrical signals, each second electrical signal corresponding to a particular one of the one or more first electrical signals injected by a particular first electrode. At step 1030, the electronic device may determine, based on the one or more second electrical signals, an N-dimensional vector having N elements. In particular embodiments, the N-dimensional vector may be determined in real-time based on the touch sensor response signals of a user touch event. Each element of the vector may correspond to a value associated with a particular second electrical signal received by a particular second electrode. Each element of the vector may depend at least on a relative location between the particular first electrode injecting the particular first electrical signal and the particular second electrode receiving the particular second electrical signal, the signal frequency of the particular first electrical signal, and a user touch location on the touch sensor. At step 1040, the electronic device may determine the user touch location based on the vector using at least one of a lookup table, a curve-fitting coefficient set, or a machine-learning model.

In particular embodiments, the electronic device may determine one or more properties of the vector including, for example, but not limited to, a distance with respect to a reference vector, an angle with respect to a reference vector, or a sum of all elements of the vector, etc. In particular embodiments, the electronic device may determine that a user touches the touch sensor by comparing the one or more properties to one or more pre-determined thresholds. The user touch location may be determined in response to the determination that the user touches the touch sensor. In particular embodiments, the one or more second electrical signals may be digitized by one or more analog-to-digital converters and may be filtered by one or more filters to improve a signal-to-noise ratio. In particular embodiments, the one or more second signals may be streamed into a number of input buffers. The electronic device may compute the power spectral density for each input buffer of the input buffers. The electronic device may determine an average power spectral density of each second electrical signal from multiple input buffers. The average power spectral density may correspond to an element in the vector corresponding to a second electrical signal.

In particular embodiments, the electronic device may determine, during a calibration process, a mapping relationship between a number of vectors and a number of known touch locations of the touch sensor. In particular embodiments, the mapping relationship between the vectors and the touch locations of the touch sensor may be determined based on normalized values of the vectors. The normalized values may allow the mapping relationship to be applicable to touches by different objects, such as by different users having different finger/body sizes, or different styli. In particular embodiments, the mapping relationship may be determined based on a touch grid and may be stored in the lookup table including a number of reference vectors for the touch grid. The lookup table may map the reference vectors to respective touch locations of the touch grid. In particular embodiments, the electronic device may compare the one or more properties of the vector to respective properties of the reference vectors in the lookup table. The electronic device may determine a matching reference vector having a closest property value to the one or more properties of the vector. The user touch location may be determined based on the matching reference vector. In particular embodiments, the electronic device may determine a minimum value of the property values and determine the user touch location on the minimum value of the property values. In particular embodiments, the electronic device may determine a calculated touch location based on interpolation on multiple reference vectors stored in the lookup table and determine the user touch location based on the calculated touch location.

In particular embodiments, the mapping relationship may be stored as the curve-fitting coefficient set which may map the calibrated vectors to the known touch locations. The electronic device may determine a calculated touch location based on the curve-fitting coefficient set and the real-time vector of the touch sensor and determine the user touch location based on the calculated touch location. In particular embodiments, the mapping relationship may be determined based on a touch grid. In particular embodiments, the electronic device may feed a number of vectors and respective known touch locations to the machine-learning model for training. The machine-learning model, after being trained, may map the calibrated vectors to respective known touch locations. In particular embodiments, the electronic device may feed a real-time vector of the touch sensor to the machine-learning model and determine an estimated touch location based on the machine-learning model. In particular embodiments, the one or more first electrical signals and the one or more second electrical signals may be voltage signals. In particular embodiments, the resistive layer may have a resistivity in a range of 200 Kohms to 1 Mohms. In particular embodiments, the one or more first electrodes and the one or more second electrodes may be coupled to the resistive layer at different locations.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for determining a user touch location based on a real-time N-dimensional vector of the touch sensor including the particular steps of the method of FIG. 10, this disclosure contemplates any suitable method for determining a user touch location based on a real-time N-dimensional vector of the touch sensor including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
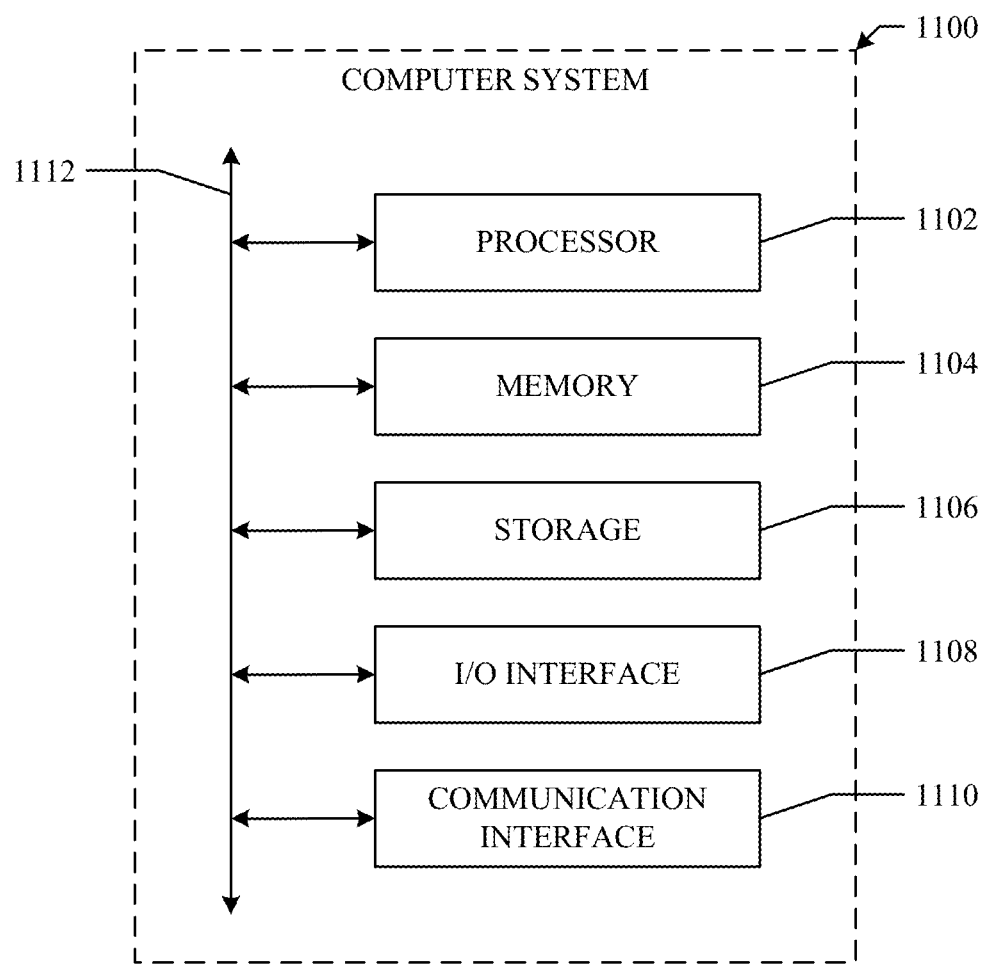
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1101, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1101 includes hardware for executing instructions, such as those making up a computer program. As an example and not by way of limitation, to execute instructions, processor 1101 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1101 may include one or more internal caches for data, instructions, or addresses. This disclosure contemplates processor 1101 including any suitable number of any suitable internal caches, where appropriate. As an example and not by way of limitation, processor 1101 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1101. Data in the data caches may be copies of data in memory 1104 or storage 1106 for instructions executing at processor 1101 to operate on; the results of previous instructions executed at processor 1101 for access by subsequent instructions executing at processor 1101 or for writing to memory 1104 or storage 1106; or other suitable data. The data caches may speed up read or write operations by processor 1101. The TLBs may speed up virtual-address translation for processor 1101. In particular embodiments, processor 1101 may include one or more internal registers for data, instructions, or addresses. This disclosure contemplates processor 1101 including any suitable number of any suitable internal registers, where appropriate. Where appropriate, processor 1101 may include one or more arithmetic logic units (ALUs); be a multi-core processor; or include one or more processors 1101. Although this disclosure describes and illustrates a particular processor, this disclosure contemplates any suitable processor.

In particular embodiments, memory 1104 includes main memory for storing instructions for processor 1101 to execute or data for processor 1101 to operate on. As an example and not by way of limitation, computer system 1100 may load instructions from storage 1106 or another source (such as, for example, another computer system 1100) to memory 1104. Processor 1101 may then load the instructions from memory 1104 to an internal register or internal cache. To execute the instructions, processor 1101 may retrieve the instructions from the internal register or internal cache and decode them. During or after execution of the instructions, processor 1101 may write one or more results (which may be intermediate or final results) to the internal register or internal cache. Processor 1101 may then write one or more of those results to memory 1104. In particular embodiments, processor 1101 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1101 to memory 1104. Bus 1112 may include one or more memory buses, as described below. In particular embodiments, one or more memory management units (MMUs) reside between processor 1101 and memory 1104 and facilitate accesses to memory 1104 requested by processor 1101. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1101 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1101 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device comprising a plurality of electrodes:
   injecting, by each of one or more first electrodes, one or more first electrical signals into a resistive layer of a touch sensor, wherein each first electrical signal has an associated signal frequency;
   receiving, at each of one or more of second electrodes, one or more second electrical signals, each second electrical signal corresponding to a particular one of the one or more first electrical signals injected by a particular first electrode;
   determining, based on the one or more second electrical signals, a vector having a plurality of elements, wherein each element of the vector corresponds to a value associated with a particular second electrical signal received by a particular second electrode, and each element depends at least on:
      a relative location between the particular first electrode injecting the particular first electrical signal and the particular second electrode receiving the particular second electrical signal;
      the signal frequency of the particular first electrical signal; and
      a user touch location on the touch sensor;
   determining one or more properties of the vector, wherein the one or more properties comprise a distance with respect to a reference vector, an angle with respect to a reference vector, or a sum of all elements of the vector; and
   determining the user touch location based on the vector using at least one of a lookup table, a curve-fitting coefficient set, or a machine-learning model.

2. The method of claim 1, further comprising:
   determining whether a user has touched the touch sensor by comparing the one or more properties to one or more pre-determined thresholds, wherein the user touch location is determined in response to the determination that the user has touched the touch sensor.

3. The method of claim 1, wherein the one or more second electrical signals are digitized by one or more analog-to-digital converters, and wherein the one or more second electrical signals are filtered by one or more filters.

4. The method of claim 3, wherein the one or more second signals are streamed into a plurality of input buffers, further comprising:
   computing the power spectral density for each input buffer of the plurality of input buffers; and
   determining an average power spectral density of each second electrical signal from multiple input buffers, wherein the average power spectral density corresponds to an element of the vector corresponding to that second electrical signal.

5. The method of claim 1, further comprising:
   determining, during a calibration process, a mapping relationship between a plurality of vectors and a plurality of predetermined touch locations of the touch sensor.

6. The method of claim 5, wherein the mapping relationship between the plurality of vectors and the plurality of predetermined touch locations of the touch sensor is determined based on normalized values of the plurality of vectors.

7. The method of claim 5, wherein the mapping relationship is determined based on a touch grid, wherein the mapping relationship is stored in the lookup table comprising a plurality of reference vectors for the touch grid, and wherein the lookup table maps the plurality of reference vectors to respective touch locations of the touch grid.

8. The method of claim 7, further comprising:
   comparing the one or more properties of the vector to respective properties of the plurality of reference vectors in the lookup table; and
   determining a matching reference vector having a closest property value to the one or more properties of the vector, wherein the user touch location is determined based on the matching reference vector.

9. The method of claim 7, further comprising:
   determining a minimum value of the plurality of property values, and wherein the user touch location is determined based on the minimum value of the plurality of property values.

10. The method of claim 7, further comprising:
    determining a calculated touch location based on interpolation on multiple reference vectors stored in the lookup table, wherein the user touch location is determined based on the calculated touch location.

11. The method of claim 5, wherein the mapping relationship is stored as a curve-fitting coefficient set, wherein the curve-fitting coefficient set maps the plurality of vectors to the plurality of predetermined touch locations.

12. The method of claim 11, furthering comprising:
determining, a calculated touch location based on the curve-fitting coefficient set and the vector, and wherein the user touch location is determined based on the calculated touch location.

13. The method of claim 5, further comprising:
sending the plurality of vectors and the plurality of predetermined touch locations to the machine-learning model for training, wherein the machine-learning model, after being trained, maps the plurality of vectors to the plurality of predetermined touch locations.

14. The method of claim 13, further comprising:
determining, an estimated touch location based on the machine-learning model and the plurality of vectors, and wherein the user touch location is determined based on the estimated touch location.

15. The method of claim 1, wherein the one or more first electrical signals and the one or more second electrical signals are voltage signals.

16. The method of claim 1, wherein the resistive layer has a resistivity in a range of 200 Kohms to 1 Mohms.

17. The method of claim 1, wherein the one or more first electrodes and the one or more second electrodes are coupled to the resistive layer at different locations.

18. One or more computer-readable non-transitory storage media embodying software that is operable when executed to configure an electronic device to:
inject, by each of one or more first electrodes, one or more first electrical signals into a resistive layer of a touch sensor, wherein each first electrical signal has an associated signal frequency;
receive, at each of one or more of second electrodes, one or more second electrical signals, each second electrical signal corresponding to a particular one of the one or more first electrical signals injected by a particular first electrode;
determine, based on the one or more second electrical signals, a vector having a plurality of elements, wherein each element of the vector corresponds to a value associated with a particular second electrical signal received by a particular second electrode, and each element depends at least on:
a relative location between the particular first electrode injecting the particular first electrical signal and the particular second electrode receiving the particular second electrical signal;
the signal frequency of the particular first electrical signal; and
a user touch location on the touch sensor;
determine one or more properties of the vector, wherein the one or more properties comprise a distance with respect to a reference vector, an angle with respect to a reference vector, or a sum of all elements of the vector, and
determine the user touch location based on the vector using at least one of a lookup table, a curve-fitting coefficient set, or a machine-learning model.

19. A system comprising:
one or more processors; and
a non-transitory memory coupled to the processors comprising instructions executable by the processors, the processors operable when executing the instructions to:
inject, by each of one or more first electrodes, one or more first electrical signals into a resistive layer of a touch sensor, wherein each first electrical signal has an associated signal frequency;
receive, at each of one or more of second electrodes, one or more second electrical signals, each second electrical signal corresponding to a particular one of the one or more first electrical signals injected by a particular first electrode;
determine, based on the one or more second electrical signals, a vector having a plurality of elements, wherein each element of the vector corresponds to a value associated with a particular second electrical signal received by a particular second electrode, and each element depends at least on:
a relative location between the particular first electrode injecting the particular first electrical signal and the particular second electrode receiving the particular second electrical signal;
the signal frequency of the particular first electrical signal; and
a user touch location on the touch sensor; and
determine one or more properties of the vector, wherein the one or more properties comprise a distance with respect to a reference vector, an angle with respect to a reference vector, or a sum of all elements of the vector;
determine the user touch location based on the vector using at least one of a lookup table, a curve-fitting coefficient set, or a machine-learning model.

* * * * *